(12) United States Patent
Chang et al.

(10) Patent No.: US 9,307,317 B2
(45) Date of Patent: Apr. 5, 2016

(54) WIRELESS PROGRAMMABLE MICROPHONE APPARATUS AND SYSTEM FOR INTEGRATED SURVEILLANCE SYSTEM DEVICES

(71) Applicant: Coban Technologies, Inc., Houston, TX (US)

(72) Inventors: Hung C Chang, Sugar Land, TX (US); Terry Wayne Boykin, Katy, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

(21) Appl. No.: 14/593,956

(22) Filed: Jan. 9, 2015

(65) Prior Publication Data

US 2016/0066085 A1    Mar. 3, 2016

Related U.S. Application Data

(63) Continuation-in-part of application No. 14/588,139, filed on Dec. 31, 2014.

(60) Provisional application No. 62/044,139, filed on Aug. 29, 2014.

(51) Int. Cl.
*H04R 3/00*          (2006.01)

(52) U.S. Cl.
CPC .............. *H04R 3/00* (2013.01); *H04R 2420/07* (2013.01)

(58) Field of Classification Search
CPC .. G06F 19/323; G06F 19/3481; H04W 12/06; H04W 12/08; H04W 12/04; H04L 67/12
See application file for complete search history.

(56) References Cited

U.S. PATENT DOCUMENTS

| 4,344,184 | A | 8/1982 | Edwards |
| 4,543,665 | A | 9/1985 | Sotelo et al. |

(Continued)

FOREIGN PATENT DOCUMENTS

| CN | 2907145 Y | 5/2007 |
| CN | 101309088 A | 11/2008 |

(Continued)

OTHER PUBLICATIONS

Office Action issued in U.S. Appl. No. 11/369,502 on Mar. 16, 2010.

(Continued)

*Primary Examiner* — Fan Tsang
*Assistant Examiner* — Eugene Zhao
(74) *Attorney, Agent, or Firm* — Chowdhury Law Group, P.C.

(57) ABSTRACT

A wireless programmable microphone apparatus and related devices are disclosed. The programmable wireless microphone apparatus may be used by a law enforcement agency to collect data that may be used as evidence in a legal proceeding. The wireless programmable microphone apparatus includes one or more internal storage devices that may be secure storage drives and/or be pre-configured to execute one or more related applications in a plug-in fashion. The storage device may contain a suite of applications that are pre-configured to execute without requiring "installation" on a computer system prior to execution. The wireless programmable microphone may have one or more wireless communication and connection interfaces to stream audio and associated metadata to an associated mobile surveillance system. The wireless communication interfaces may also be used for device authentication. Optionally, audio and metadata information may be stored locally and synchronized with other devices at a later time.

19 Claims, 13 Drawing Sheets

(56) References Cited

U.S. PATENT DOCUMENTS

| | | |
|---|---|---|
| 4,590,614 A | 5/1986 | Erat |
| 4,910,795 A | 3/1990 | McCowen et al. |
| 5,012,335 A | 4/1991 | Cohodar |
| 5,111,289 A | 5/1992 | Lucas et al. |
| 5,408,330 A | 4/1995 | Squicciarini et al. |
| 5,477,397 A | 12/1995 | Naimpally et al. |
| 5,613,032 A | 3/1997 | Cruz et al. |
| 5,724,475 A | 3/1998 | Kirsten |
| 5,815,093 A | 9/1998 | Kikinis |
| 5,841,978 A | 11/1998 | Rhoads |
| 5,862,260 A | 1/1999 | Rhoads |
| 5,926,218 A | 7/1999 | Smith |
| 5,946,343 A | 8/1999 | Schotz et al. |
| 5,970,098 A | 10/1999 | Herzberg |
| 6,002,326 A | 12/1999 | Turner |
| 6,009,229 A | 12/1999 | Kawamura |
| 6,028,528 A | 2/2000 | Lorenzetti et al. |
| 6,038,257 A | 3/2000 | Brusewitz et al. |
| 6,122,403 A | 9/2000 | Rhoads |
| 6,141,611 A | 10/2000 | Mackey et al. |
| 6,163,338 A | 12/2000 | Johnson et al. |
| 6,175,860 B1 | 1/2001 | Gaucher |
| 6,275,773 B1 | 8/2001 | Lemelson et al. |
| 6,298,290 B1 | 10/2001 | Abe et al. |
| 6,346,965 B1 | 2/2002 | Toh |
| 6,411,874 B2 | 6/2002 | Morgan et al. |
| 6,421,080 B1 | 7/2002 | Lambert |
| 6,424,820 B1 | 7/2002 | Burdick et al. |
| 6,462,778 B1 | 10/2002 | Abram et al. |
| 6,505,160 B1 | 1/2003 | Levy et al. |
| 6,510,177 B1 | 1/2003 | De Bonet et al. |
| 6,518,881 B2 | 2/2003 | Monroe |
| 6,624,611 B2 | 9/2003 | Kirmuss |
| 6,778,814 B2 | 8/2004 | Koike |
| 6,788,338 B1 | 9/2004 | Dinev et al. |
| 6,788,983 B2 | 9/2004 | Zheng |
| 6,789,030 B1 | 9/2004 | Coyle et al. |
| 6,791,922 B2 | 9/2004 | Suzuki |
| 6,825,780 B2 | 11/2004 | Saunders et al. |
| 6,831,556 B1 | 12/2004 | Boykin |
| 7,010,328 B2 | 3/2006 | Kawasaki et al. |
| 7,091,851 B2 | 8/2006 | Mason et al. |
| 7,119,832 B2 | 10/2006 | Blanco et al. |
| 7,120,477 B2 | 10/2006 | Huang |
| 7,155,615 B1 | 12/2006 | Silvester |
| 7,167,519 B2 | 1/2007 | Comaniciu et al. |
| 7,190,882 B2 | 3/2007 | Gammenthaler |
| 7,231,233 B2 | 6/2007 | Gosieski, Jr. |
| 7,272,179 B2 | 9/2007 | Siemens et al. |
| 7,317,837 B2 | 1/2008 | Yatabe et al. |
| 7,356,473 B2 | 4/2008 | Kates |
| 7,386,219 B2 | 6/2008 | Ishige |
| 7,410,371 B2 | 8/2008 | Shabtai et al. |
| 7,414,587 B2 | 8/2008 | Stanton |
| 7,428,314 B2 | 9/2008 | Henson |
| 7,515,760 B2 | 4/2009 | Sai et al. |
| 7,542,813 B2 | 6/2009 | Nam |
| 7,551,894 B2 | 6/2009 | Gerber |
| 7,554,587 B2 | 6/2009 | Shizukuishi |
| 7,618,260 B2 | 11/2009 | Daniel et al. |
| 7,631,195 B1 | 12/2009 | Yu et al. |
| 7,688,203 B2 | 3/2010 | Rockefeller et al. |
| 7,693,289 B2 | 4/2010 | Stathem et al. |
| 7,768,548 B2 | 8/2010 | Silvernail et al. |
| 7,778,601 B2 | 8/2010 | Seshadri et al. |
| 7,792,189 B2 | 9/2010 | Finizio et al. |
| 7,818,078 B2 | 10/2010 | Iriarte |
| 7,835,530 B2 | 11/2010 | Avigni |
| 7,868,912 B2 | 1/2011 | Venetianer et al. |
| 7,877,115 B2 | 1/2011 | Seshadri et al. |
| 7,974,429 B2 | 7/2011 | Tsai |
| 7,995,652 B2 | 8/2011 | Washington |
| 8,068,023 B2 | 11/2011 | Dulin et al. |
| 8,081,214 B2 | 12/2011 | Vanman et al. |
| 8,086,277 B2 | 12/2011 | Ganley et al. |
| 8,121,306 B2 | 2/2012 | Cilia et al. |
| 8,126,276 B2 | 2/2012 | Bolle et al. |
| 8,126,968 B2 | 2/2012 | Rodman et al. |
| 8,139,796 B2 | 3/2012 | Nakashima et al. |
| 8,144,892 B2 | 3/2012 | Shemesh et al. |
| 8,145,134 B2 | 3/2012 | Henry et al. |
| 8,150,089 B2 | 4/2012 | Segawa et al. |
| 8,154,666 B2 | 4/2012 | Mody |
| 8,166,220 B2 | 4/2012 | Ben-Yacov et al. |
| 8,174,577 B2 | 5/2012 | Chou |
| 8,195,145 B2 | 6/2012 | Angelhag |
| 8,208,024 B2 | 6/2012 | Dischinger |
| 8,228,364 B2 | 7/2012 | Cilia |
| 8,230,149 B1 | 7/2012 | Long et al. |
| 8,253,796 B2 | 8/2012 | Renkis |
| 8,254,844 B2 | 8/2012 | Kuffner et al. |
| 8,260,217 B2 | 9/2012 | Chang et al. |
| 8,264,540 B2 | 9/2012 | Chang et al. |
| 8,270,647 B2 | 9/2012 | Crawford et al. |
| 8,289,370 B2 | 10/2012 | Civanlar et al. |
| 8,300,863 B2 | 10/2012 | Hendriksen et al. |
| 8,311,549 B2 | 11/2012 | Chang |
| 8,311,983 B2 | 11/2012 | Guzik |
| 8,358,980 B2 | 1/2013 | Tajima et al. |
| 8,380,131 B2 | 2/2013 | Chiang |
| 8,422,944 B2 | 4/2013 | Flygh et al. |
| 8,446,469 B2 | 5/2013 | Blanco et al. |
| 8,489,065 B2 | 7/2013 | Green et al. |
| 8,489,151 B2 | 7/2013 | Van Engelen et al. |
| 8,497,940 B2 | 7/2013 | Green et al. |
| 8,554,145 B2 | 10/2013 | Fehr |
| 8,612,708 B2 | 12/2013 | Drosch |
| 8,630,908 B2 | 1/2014 | Forster |
| 8,661,507 B1 | 2/2014 | Hesselink et al. |
| 8,707,392 B2 * | 4/2014 | Birtwhistle et al. .. G06F 19/323 600/365 |
| 8,780,199 B2 | 7/2014 | Mimar |
| 9,041,803 B2 | 5/2015 | Chen et al. |
| 2002/0051061 A1 | 5/2002 | Peters et al. |
| 2002/0135679 A1 | 9/2002 | Scaman |
| 2003/0052970 A1 | 3/2003 | Dodds et al. |
| 2003/0080878 A1 | 5/2003 | Kirmuss |
| 2003/0081127 A1 | 5/2003 | Kirmuss |
| 2003/0081935 A1 | 5/2003 | Kirmuss |
| 2003/0095688 A1 | 5/2003 | Kirmuss |
| 2003/0103140 A1 | 6/2003 | Watkins |
| 2003/0151663 A1 | 8/2003 | Lorenzetti et al. |
| 2003/0197629 A1 | 10/2003 | Saunders et al. |
| 2004/0008255 A1 | 1/2004 | Lewellen |
| 2004/0051793 A1 | 3/2004 | Tecu et al. |
| 2004/0146272 A1 | 7/2004 | Kessel et al. |
| 2004/0177253 A1 | 9/2004 | Wu et al. |
| 2005/0007458 A1 | 1/2005 | Benattou |
| 2005/0083404 A1 | 4/2005 | Pierce et al. |
| 2005/0088521 A1 | 4/2005 | Blanco et al. |
| 2005/0122397 A1 | 6/2005 | Henson et al. |
| 2005/0154907 A1 | 7/2005 | Han et al. |
| 2005/0185936 A9 | 8/2005 | Lao et al. |
| 2005/0243171 A1 | 11/2005 | Ross, Sr. et al. |
| 2005/0286476 A1 | 12/2005 | Crosswy et al. |
| 2006/0055521 A1 | 3/2006 | Blanco et al. |
| 2006/0072672 A1 | 4/2006 | Holcomb et al. |
| 2006/0077256 A1 | 4/2006 | Silvemail et al. |
| 2006/0078046 A1 | 4/2006 | Lu |
| 2006/0130129 A1 | 6/2006 | Dai et al. |
| 2006/0133476 A1 | 6/2006 | Page et al. |
| 2006/0165386 A1 | 7/2006 | Garoutte |
| 2006/0270465 A1 | 11/2006 | Lee et al. |
| 2006/0274116 A1 | 12/2006 | Wu |
| 2007/0064108 A1 | 3/2007 | Haler |
| 2007/0086601 A1 | 4/2007 | Mitchler |
| 2007/0111754 A1 | 5/2007 | Marshall et al. |
| 2007/0124292 A1 | 5/2007 | Kirshenbaum et al. |
| 2007/0217761 A1 | 9/2007 | Chen et al. |
| 2008/0005472 A1 | 1/2008 | Khalidi et al. |
| 2008/0030782 A1 | 2/2008 | Watanabe |
| 2008/0129825 A1 | 6/2008 | DeAngelis et al. |
| 2008/0165250 A1 | 7/2008 | Ekdahl et al. |
| 2008/0186129 A1 | 8/2008 | Fitzgibbon |

(56) References Cited

U.S. PATENT DOCUMENTS

| | | |
|---|---|---|
| 2008/0208755 A1 | 8/2008 | Malcolm |
| 2008/0303903 A1 | 12/2008 | Bentley et al. |
| 2009/0017881 A1 | 1/2009 | Madrigal |
| 2009/0074216 A1 | 3/2009 | Bradford et al. |
| 2009/0076636 A1 | 3/2009 | Bradford et al. |
| 2009/0195651 A1 | 8/2009 | Leonard et al. |
| 2009/0213902 A1 | 8/2009 | Jeng |
| 2010/0026809 A1 | 2/2010 | Curry |
| 2010/0030929 A1 | 2/2010 | Ben-Yacov et al. |
| 2010/0057444 A1 | 3/2010 | Cilia |
| 2010/0081466 A1 | 4/2010 | Mao |
| 2010/0131748 A1 | 5/2010 | Lin |
| 2010/0180051 A1 | 7/2010 | Harris |
| 2010/0274816 A1 | 10/2010 | Guzik |
| 2010/0287545 A1 | 11/2010 | Corbefin |
| 2010/0289648 A1 | 11/2010 | Ree |
| 2010/0302979 A1 | 12/2010 | Reunamaki |
| 2010/0309971 A1 | 12/2010 | Vanman et al. |
| 2011/0016256 A1 | 1/2011 | Hatada |
| 2011/0044605 A1 | 2/2011 | Vanman et al. |
| 2011/0142156 A1 | 6/2011 | Haartsen |
| 2011/0233078 A1* | 9/2011 | Monaco et al. ............... 206/223 |
| 2011/0234379 A1 | 9/2011 | Lee |
| 2011/0280143 A1 | 11/2011 | Li et al. |
| 2011/0280413 A1 | 11/2011 | Wu et al. |
| 2011/0299457 A1 | 12/2011 | Green, III et al. |
| 2012/0014534 A1 | 1/2012 | Bodley et al. |
| 2012/0078397 A1 | 3/2012 | Lee et al. |
| 2012/0163309 A1 | 6/2012 | Ma et al. |
| 2012/0173577 A1 | 7/2012 | Millar et al. |
| 2012/0266251 A1* | 10/2012 | Birtwhistle et al. ............ 726/26 |
| 2012/0307070 A1 | 12/2012 | Pierce |
| 2012/0310394 A1 | 12/2012 | Hoiydi |
| 2012/0310395 A1 | 12/2012 | Hoiydi |
| 2013/0201884 A1 | 8/2013 | Freda et al. |
| 2013/0223653 A1 | 8/2013 | Chang |
| 2013/0236160 A1 | 9/2013 | Gentile et al. |
| 2013/0242262 A1 | 9/2013 | Lewis |
| 2013/0251173 A1 | 9/2013 | Ejima et al. |
| 2013/0268357 A1 | 10/2013 | Heath |
| 2013/0339447 A1 | 12/2013 | Ervine |
| 2013/0346660 A1 | 12/2013 | Kwidzinski et al. |
| 2014/0078304 A1 | 3/2014 | Othmer |
| 2014/0092251 A1 | 4/2014 | Troxel |
| 2014/0143545 A1* | 5/2014 | McKeeman ........ H04L 63/0853 713/168 |
| 2014/0162598 A1 | 6/2014 | Villa-Real |
| 2014/0280584 A1 | 9/2014 | Ervine |
| 2014/0281498 A1 | 9/2014 | Bransom et al. |
| 2014/0297687 A1 | 10/2014 | Lin |
| 2015/0032535 A1 | 1/2015 | Li et al. |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 10/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 9738526 A1 | 10/1997 |
| WO | 0013410 A1 | 3/2000 |
| WO | 0021258 A1 | 4/2000 |
| WO | 0045587 A2 | 8/2000 |
| WO | 0072186 A2 | 11/2000 |
| WO | 02061955 A2 | 8/2002 |
| WO | 2004066590 | 8/2004 |
| WO | 2004111851 A1 | 12/2004 |
| WO | 2005053325 A2 | 6/2005 |
| WO | 2005054997 A2 | 6/2005 |
| WO | 2007114988 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |

OTHER PUBLICATIONS

Office Action issued in U.S. Appl. No. 11/369,502 on Sep. 30, 2010.
Office Action issued in U.S. Appl. No. 11/369,502 on Jul. 14, 2011.
Office Action issued in U.S. Appl. No. 11/369,502 on Jan. 31, 2012.
Examiner's Answer (to Appeal Brief) issued in U.S. Appl. No. 11/369,502 on Oct. 24, 2012.
Office Action issued in U.S. Appl. No. 13/723,747 on Mar. 22, 2013.
Office Action issued in U.S. Appl. No. 13/723,747 on Jun. 26, 2013.
Office Action issued in U.S. Appl. No. 13/723,747 on Sep. 10, 2013.
Advisory Action issued in U.S. Appl. No. 13/723,747 on Feb. 24, 2014.
Office Action issued in U.S. Appl. No. 13/723,747 on Mar. 20, 2014.
Office Action issued in U.S. Appl. No. 13/723,747 on Nov. 10, 2014.
Notice of Allowance and Fees Due issued in U.S. Appl. No. 13/723,747 on Mar. 30, 2015.
First Action Interview Pilot Program Pre-Interview Communication issued in U.S. Appl. No. 14/588,139 on May 14, 2015.
Office Action issued in U.S. Appl. No. 14/593,722 on Apr. 10, 2015.
Office Action issued in U.S. Appl. No. 14/593,853 on Apr. 20, 2015.
PCT International Search Report and Written Opinion issued in Application No. PCT/US07/63485 on Feb. 8, 2008, 10 pages.
Chapter 5: "Main Memory," Introduction to Computer Science course, 2004, 20 pages, available at http://www2.cs.ucy.ac.cy/~nicolast/courses/lectures/MainMemory.pdf.
Sony Corporation, Digital Still Camera (MVC-CD200/CD300), Operation Manual, 2001, 108 pages, Sony, Japan.
Steve'S Digicams, Kodak Professional DCS 620 Digital Camera, 1999, 11 pages, United States, available at: http://www.steves-digicams.com/dcs620.html.
Gregory J. Allen," The Feasibility of Implementing Video Teleconferencing Systems Aboard Afloat Naval Units" (Master's Thesis, Naval Postgraduate School, Monterey, California), Mar. 1990, 143 pages.
Bell-Northern Research Ltd., "A Multi-Bid Rate Interframe Movement Compensated Multimode Coder for Video Conferencing" (Final Report prepared for DARPA), Apr. 1982, 92 pages, Ottawa, Ontario, Canada.
Xiaoqing Zhu, Eric Setton, Bernd Girod, "Rate Allocation for Multi-Camera Surveillance Over an Ad Hoc Wireless Network," 2004, 6 pages, available at http://msw3.stanford.edu/~zhuxq/papers/pcs2004.pdf.
U.S. Appl. No. 14/588,139, filed Dec. 31, 2014, 30 pages.
Notice of Allowance issued in U.S. Appl. No. 14/588,139 on Aug. 14, 2015, 19 pages.
Office Action issued in U.S. Appl. No. 14/715,742 on Aug. 21, 2015, 13 pages.
Office Action issued in U.S. Appl. No. 14/593,853 on Sep. 11, 2015, 48 pages.
"IEEE 802.1X," Wikipedia, Aug. 23, 2013, 8 pages, available at: http://en.wikipedia.org/w/index.php?title=IEEE_802.1X&oldid=569887090.
Office Action issued in U.S. Appl. No. 14/686,192 on Dec. 24, 2015, 12 pages.
Office Action issued in U.S. Appl. No. 14/593,722 on Sep. 25, 2015, 39 pages.

* cited by examiner

WIRELESS PROGRAMMABLE MICROPHONE APPARATUS AND SYSTEM FOR INTEGRATED SURVEILLANCE SYSTEM DEVICES

CROSS-REFERENCE TO RELATED APPLICATIONS

This application is a continuation-in-part of U.S. patent application Ser. No. 14/588,139, filed Dec. 31, 2014, entitled, "Hidden Plug-in Storage Drive for Data Integrity," by Hung C. Chang, which is incorporated herein by reference for all applicable purposes. This application claims the benefit of, and priority to, U.S. Provisional Application No. 62/044,139, filed Aug. 29, 2014, and entitled, "Compact Multi-Function DVR with Multiple Integrated Wireless Data Communication Devices," which is incorporated herein by reference. This application is also related to U.S. patent application Ser. No. 14/593,722, entitled, "Self-contained Storage Device for Self-contained Application Execution," by Allan Chen, et al., and U.S. patent application Ser. No. 14/593,853, entitled, "Portable Camera Apparatus and System for Integrated Surveillance System Devices," by Hung C. Chang, et al., each filed Jan. 9, 2015 and incorporated herein by reference for all applicable purposes.

TECHNICAL FIELD OF THE INVENTION

This disclosure relates generally to a wireless programmable microphone apparatus including an internal storage drive which may be configured for data security and integrity and/or for self-contained application execution. More particularly, but not by way of limitation, this disclosure relates to a wireless programmable microphone including an internal storage device that contains a suite of software applications that are pre-configured to execute without requiring "installation" on a computer system prior to execution.

SUMMARY

According to a first aspect of the invention, a portable recording device is disclosed. The portable recording device includes, in some embodiments, a microphone, a storage device, and one or more processors communicatively coupled to the microphone and the storage device. The storage device may be configured to store one or more pre-configured applications stored in the flash memory area that are configured for self-contained execution from the storage device. The self-contained execution from the storage device refers to the execution of the one or more pre-configured applications utilizing execution information only from the flash memory storage area. The execution information includes reference information based on a location address assigned to the storage device as a result of connecting the portable recording device to a computer system or computer device. The one or more processors may be further configured to simultaneously record captured audio and metadata information and wirelessly stream the captured audio and metadata information to another device.

In a second aspect of the invention, the self-contained application storage drive may be configured as a secure storage drive. The secure storage drive may include a first portion of firmware instructions pertaining to access to the secure storage drive. The first portion of firmware instructions have access to unhide information stored on the secure storage drive. The unhide information pertains to unhiding the secure storage drive to make it visible to an operating system that has attained access to the secure storage drive. The secure storage drive also has a second portion of firmware instructions pertaining to access to the flash memory storage area of the secure storage drive. The data access controller of the secure storage drive is further configured to utilize the first and second portions of firmware instructions (which may be combined into a single set of firmware instructions) to control access to the secure storage drive and the flash memory storage area. The first portion of firmware instructions comprise instructions that initiate execution upon connection of the portable recording device and thus the secure storage drive to a computer system or computer device and block functional connection of the secure storage drive to the computer system or computer device unless the computer system or computer device provides proper authentication information. The proper authentication information is checked to make sure it properly compares to the unhide information (e.g., may be a subset or superset of unhide information). Upon receipt of proper authentication information, the first portion of firmware instructions allow functional connection of the secure storage drive to the computer device and allow the second portion of firmware instructions to control access requests from the computer device (e.g., operating system of computer device) to the flash memory storage area.

Other aspects of the embodiments described herein will become apparent from the following description and the accompanying drawings, illustrating the principles of the embodiments by way of example only.

BRIEF DESCRIPTION OF THE DRAWINGS

It being understood that the figures presented herein should not be deemed to limit or define the subject matter claimed herein, the applicants' disclosure may be understood by reference to the following description taken in conjunction with the accompanying drawings, in which like reference numerals identify like elements.

NOTATION AND NOMENCLATURE

Figure 1A:
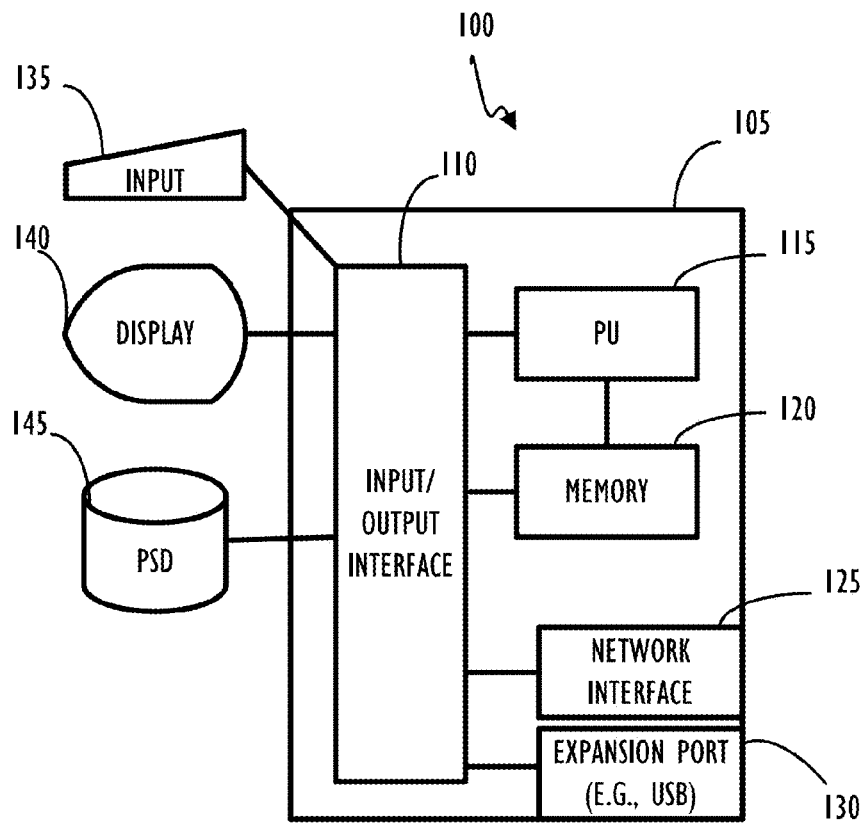
FIG. 1A illustrates an example high level architecture of a computing device in accordance with some disclosed embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

As used throughout this disclosure the terms "computer device" and "computer system" will both be used to refer to an apparatus that may be used in conjunction with disclosed embodiments of connectable storage drives and self-contained removable storage devices. As used herein, a computer device may be thought of as having a subset of functionalities as compared to a computer system. That is, a computer device may refer to a special purpose processor-based device such as a digital video surveillance system primarily configured for executing a limited number of applications. A computer system may more generally refer to a general purpose computer such as a laptop, workstation, or server which may be configured by a user to run any number of off the shelf or specially designed software applications. Computer systems and computer devices will generally interact with disclosed storage drives included in embodiments of the disclosed portable recording device in the same or similar ways. It should be noted that a computer device may be configured with hardware that would only support a subset of all possible self-contained storage devices but will function properly in conjunction with a self-contained storage device that only utilizes hardware available on that computer device.

This disclosure also refers to storage devices and storage drives interchangeably. In general, a storage device/drive represents a medium accessible by a computer to store data and executable instructions. Also, throughout this disclosure reference will be made to "plugging in" a storage drive. It is noted that "plugging in" a storage drive is just one way to connect a storage drive to a computer device/system. This disclosure is not intended to be limited to drives that physically "plug in" and disclosed embodiments are also applicable to devices that are "connected" to a computer device or computer system. For example devices may be connected by using a cable or by connecting using a computer bus. Additionally, references to "removable" storage are analogous to plugging-in/unplugging a device, connecting/disconnecting cabled access to a device, and/or establishing/disconnecting networked access to a device or storage area on a network (either wired or wireless).

The terms "hidden" and "unhidden," when referring to a storage device, are used to describe accessibility of the storage device from a connected computer device or computer system. Hidden means that the operating system of the computer system cannot access, alter, or erase any data on the storage device, at least in part, because the operating system will be unaware of the existence of the storage device. Unhidden refers to a situation where a secure storage drive configured according to embodiments of this disclosure has been properly authenticated after connection to a computer system and is visible to the operating system of the computer system. Once "unhidden" the secure storage drive may interact with the operating system of the computer system in a standard manner until such time as the secure storage drive is disconnected. Upon being disconnected the secure storage drive may return to its default "hidden" state and remain inaccessible until it is again connected and "unhidden" via proper authentication.

This disclosure also refers to a "self-contained" storage device that is pre-configured with one or more applications such that the one or more applications may execute and interact with each other without requiring "installation" on a computer system. That is, the one or more applications are pre-configured for "self-contained" execution and do not require updates to a computer registry or installation of files prior to execution. Applications on a "self-contained" storage device may be pre-configured with referential pointers that are resolved at run-time to obtain access to required components or other applications for coordinated execution.

The disclosed "self-contained" storage device may be integrated or attached to a portable recording device/apparatus such as a programmable wireless microphone and allow for storage of data captured by the portable recording apparatus. Also, when connected to a computer device or computer system, program information stored on the storage device may be used to execute applications on the computer device or system via self-contained execution as described throughout this Specification. The terms "device" and "apparatus" are used interchangeably throughout this disclosure when referring to a device or apparatus incorporating the disclosed self-contained storage device.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments are described below in the context of a surveillance system for a police car and other computer devices that support collection and maintenance of video and audio evidence for law enforcement. Examples of such computer devices include, but are not limited to, portable digital cameras, self-contained application storage drives, digital video cameras, and digital audio microphones. Uses of the disclosed pre-configured storage device (e.g., a self-contained storage drive or secure self-contained storage drive included in a programmable wireless microphone) for securing data and maintaining data integrity exist beyond the field of law enforcement and this context is illustrative and not intended to be limiting in any manner. Implementations relating to both a "secure" self-contained storage drive/device and a self-contained standard (as opposed to secure) storage drive are further discussed below. In the interest of clarity, not all features of an actual implementation are described for every embodiment disclosed in this specification. In the development of any actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Referring to FIG. 1A, an example high level architecture of a computing device 100 in accordance with some disclosed embodiments is illustrated. Computing systems such as computing device 100 may have many variations and may contain all components shown in FIG. 1A, a subset of those components, or additional components depending on different design criteria. In many cases, computing devices such as computing device 100 may be configured to connect to additional storage devices such as the "secure" storage drives or self-contained storage device disclosed herein. In one example, computing device 100 may be used to facilitate some of the disclosed functional capabilities of an integrated surveillance system for law enforcement. Example computing device 100 comprises a programmable control device (PCD) 105 which may be optionally connected to input device 135 (e.g., keyboard, mouse, touch screen, etc.), display 140 or programmable storage device (PSD) 145. Also, included with PCD 105 is a network interface 125 for communication via a network (either wired or wireless) with other computers and infrastructure devices (not shown). Note network interface 125 may be included within PCD 105 or be external to PCD 105. In either case, PCD 105 may be communicatively coupled to network interface 125. Also, note PSD 145 represents any form of non-volatile storage including, but not limited to, all forms of optical and magnetic storage elements including solid-state storage.

PCD 105 may be included in a computing system such as computing device 100 and be programmed to perform methods in accordance with this disclosure. PCD 105 comprises a processing unit (PU) 115, input-output (I/O) interface 110 and memory 120. PU 115 may include any programmable controller device including, for example, the Intel Core®, Pentium® and Celeron® processor families from Intel and the Cortex® and ARM® processor families from ARM® (INTEL® CORE®, PENTIUM® and CELERON® are registered trademarks of the Intel Corporation). CORTEX® and ARM® are registered trademarks of ARM Holdings. Memory 120 may include one or more memory modules and comprise random access memory (RAM), read only memory (ROM), programmable read only memory (PROM), programmable read-write memory, and solid state memory. It will also be recognized that PU 115 may further include some internal memory including, for example, cache memory.

Various changes in the materials, components, circuit elements, as well as in the details of the illustrated systems, devices and below described operational methods are possible without departing from the scope of the claims herein. For instance, acts in accordance with disclosed functional capabilities may be performed by a PCD (e.g., 105) executing instructions organized into one or more modules (comprised of computer program code or instructions). A PCD (e.g., 105) may include single computer processor (e.g., PU 115), a plurality of computer processors coupled by a communications link (e.g., bus or network) or one or more special purpose processors (e.g., a digital signal processor (DSP)). Such a PCD (e.g., 105) may be one element in a larger data processing system such as a general purpose or special purpose computer system. Storage media, as embodied in storage devices such as PSD 145, memory (e.g., 120) internal to PCD 105, or storage media connected via expansion port 130 are suitable for tangibly embodying computer program instructions. Storage media may include, but not be limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays, and flash devices. These types of storage media are also sometimes referred to as computer readable medium or program storage devices. PCD 105 and/or computer device 100 may also include an expansion port 130 for connecting additional devices or storage media (e.g., plug-in storage drives 150 and 155 of FIGS. 1B and 1C). In one example, expansion port 130 may be a Universal Serial Bus (USB) port and allow for plug-in and removal of drives (e.g., 150 and 155) while computer device 100 is operational. Further details regarding plug-in or connectable storage drives that are "hot pluggable" will be discussed next with reference to FIGS. 1B and 1C.

Figure 1B:
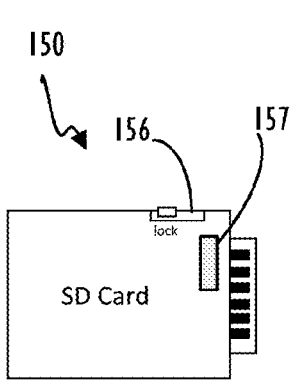
FIGS. 1B-C illustrate examples of removable plug-in storage drives which may be adapted for data integrity according to some disclosed embodiments.
Figure 1C:
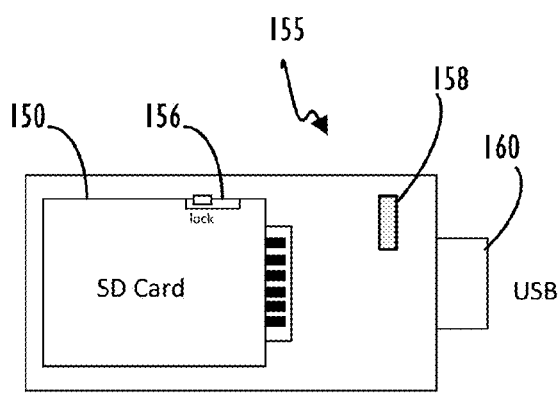

FIGS. 1B to 1C illustrate examples of removable plug-in storage drives (150 and 155) according to some disclosed embodiments. Plug-in storage drive 150 illustrates an SD (Secure Digital) card. SD cards (e.g., 150) may have a lock switch 156 which, when in the lock position, puts the SD card 150 into a read-only state such that no data in the memory of the SD card 150 may be changed in any way (including protection against formatting). In addition to one or more internal mass storage specific flash memory chips (not shown), the SD card 150 may also include an on-card intelligent controller (block 157) having functionality that may be implemented using firmware instructions. The controller 157 typically manages interface protocols to allow access to the flash memory of SD card 150 and may also be used to implement, among other things, security algorithms for copyright protection, data storage and retrieval, as well as Error Correction Code (ECC) algorithms, defect handling and diagnostics, power management, and clock control.

FIG. 1C illustrates plug-in storage drive 155 in the form of a USB flash drive (also referred to as a flash drive, pen drive, thumb drive, or simply USB drive). A USB flash drive is a data storage device that includes flash memory (e.g., SD card 150) with an integrated Universal Serial Bus (USB) interface (e.g., 160) and its associated control logic 158 (e.g., firmware instructions). It will be noted that control logic 157 and 158 provide similar functionality for each of plug-in storage drives 150 and 155 respectively but are not necessarily (and likely not) the same set of instructions for different types of storage devices. USB flash drives (e.g., 155) are typically removable and rewritable, and physically much smaller than an optical disc (not shown). When a USB drive (e.g., 155) is plugged into a computer device (e.g., computer device 100) a process referred to as "enumeration" is typically initiated. Enumeration refers to an end-to-end process of making a USB drive (e.g., 155) accessible to a computer device and its operating system. The enumeration process includes identifying and assigning unique addresses to a plugged-in device and supports making USB drives "hot pluggable" (e.g., the drive may be plugged in without restarting of the computer device or computer system). A computer device (e.g., computer device 100) typically cannot fully communicate with or access the functionality of a USB drive (e.g., 155) until that device has been properly enumerated.

Figure 2A:
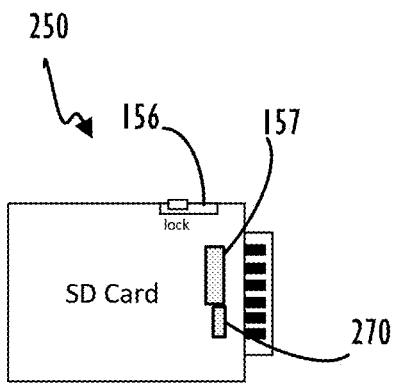
FIGS. 2A-B illustrate examples of removable plug-in storage drives including enhanced firmware for data security and integrity according to some disclosed embodiments.
Figure 2B:
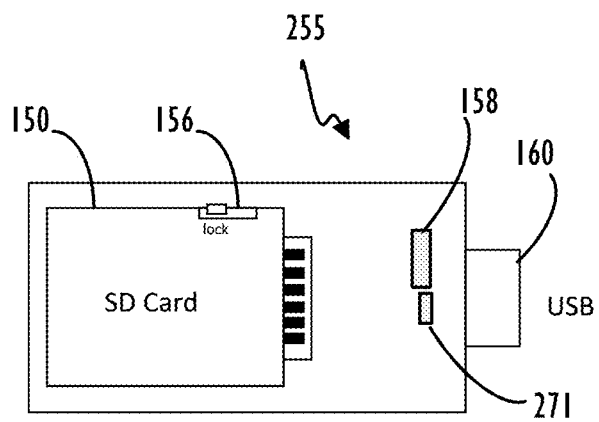

Referring now to FIGS. 2A-B, storage devices 250 and 255 are similar in functionality to storage drives 150 and 155. However, they are depicted as having added security modules 270 and 271. Security modules 270 and 271 may be incorporated into pre-existing control logic (e.g., 157 and 158) or may be implemented as an additional layer of instructions. In either case, security modules 270 and 271 represent a modification to standard interface protocols for access to memory modules on their respective protected storage devices 250 and 255. Security modules 270 and 271, according to some disclosed embodiments, further protect the integrity of data access to memory modules of the disclosed protected storage devices 250 and 255 by implementing the disclosed additional level(s) of authentication required for access by an operating system of a computer system (e.g., computer device 100) as discussed further below. It will be noted that when lock switch 156 is in the locked position for protected storage devices 250 and 255, lock switch 156 performs its normal function of making the storage device read-only, however, security modules 270 and 271 may further prevent any access to data by keeping the storage device (e.g., 250, 255) "hidden" as explained further below.

Figure 3:
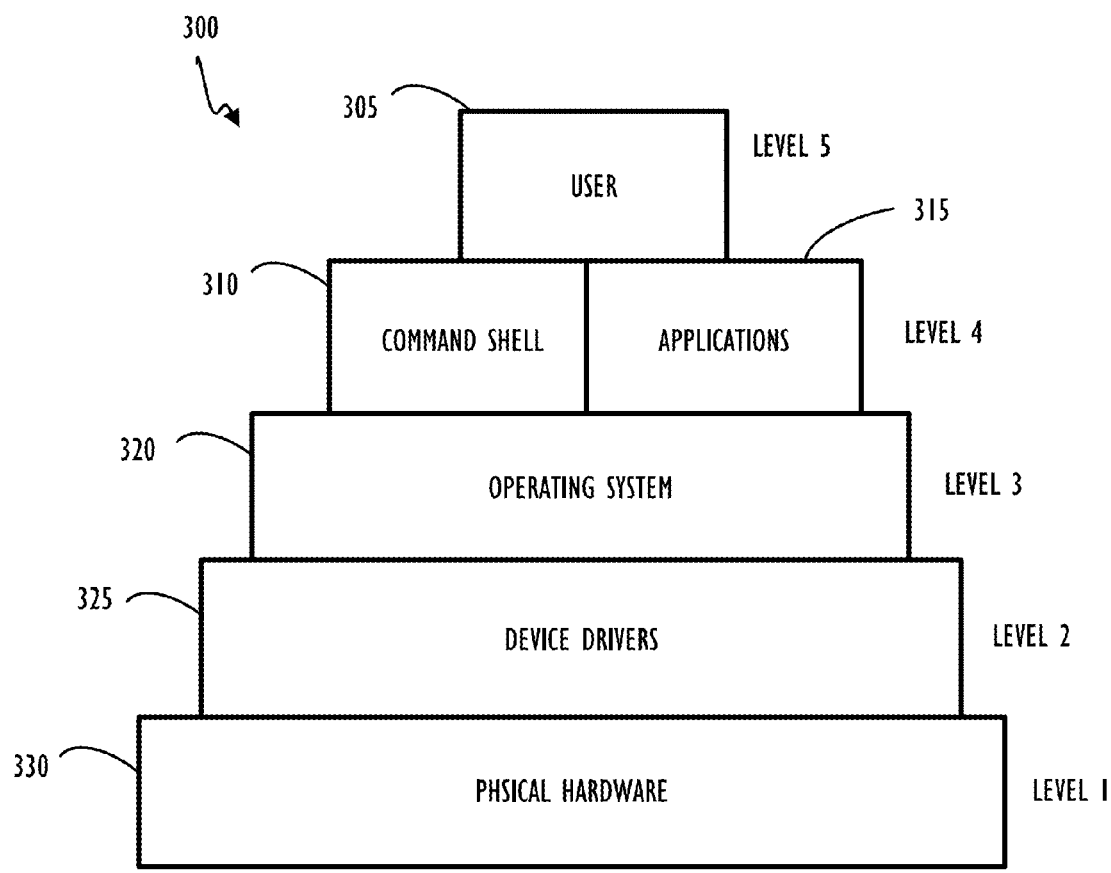
FIG. 3 illustrates a block diagram depicting a representation of a computer device using a layered model according to some disclosed embodiments.

FIG. 3 illustrates a block diagram 300 depicting a representation of a simplified layered model with functional units at each level of a computer device to assist in describing aspects of embodiments of secure storage devices (e.g., 250, 255) in accordance with this disclosure. Each of the functional units in a level typically interfaces only with the next adjoining level such that levels are not bypassed. Bypassing of levels may pose security risks and therefore designers of computer systems adhere to a model as shown in block diagram 300 (or a similar model). User 305 (e.g., a human user of a computer device) is positioned at the highest level (level 5) of this model. At the lowest level (level 1), the physical hardware 330 is represented. From the bottom up, starting at physical hardware 330, hardware components of a computer system (e.g., computer device 100 of FIG. 1) communicate with device drivers 325. Device drivers 325 are configured to understand how to communicate with each piece of physical hardware and provide an interface to the operating system 320 (level 3). Without a device driver (e.g., 325), an operating system 320 would have to incorporate device specific code to be able to interact with a particular hardware device. For the purposes of this disclosure, device drivers 325 at level 2 are not considered part of the operating system 320 at level 3. That is, even if a device driver 325 has awareness of a particular piece of physical hardware (330 at level 1) and has not allowed access to the operating system 320 at level 3, it is considered that the particular piece of hardware is not accessible to the operating system 320 or any of its commands. In other words, a particular piece of physical hardware at level 1 that has not been made accessible to operating system 320 at level 3 would remain "hidden" to the operating system 320. To complete the model discussion, command shell 310 and applications 315 provide an interface between a user 305 of the computer system and the operating system level 320. In general, command shell 310 and applications 315 provide user 305 with access to functionality being provided by the computer system (e.g., computer device 100).

Figure 4:
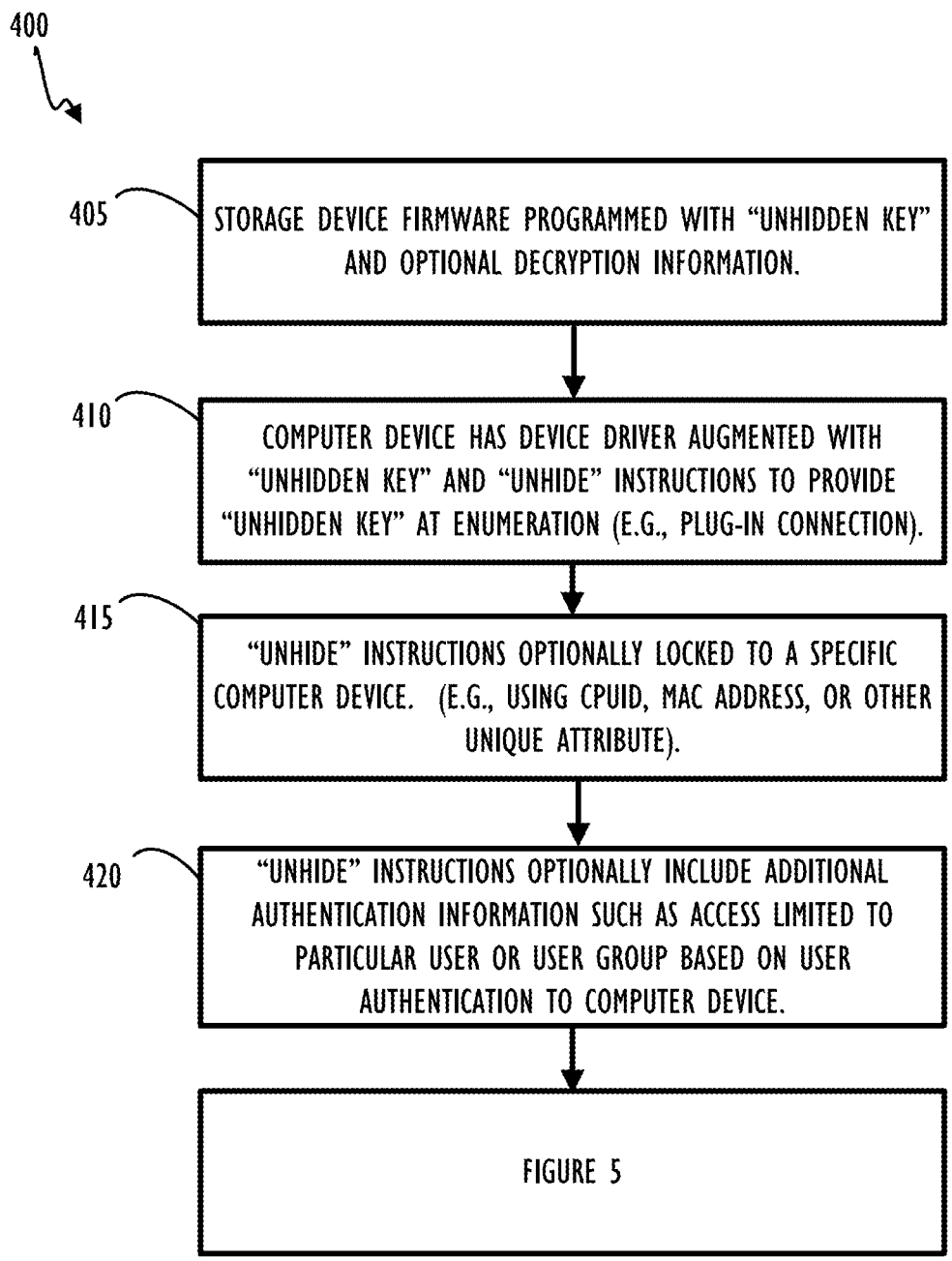
FIG. 4 illustrates a possible process flow to configure a computer device and a removable secure storage drive according to some disclosed embodiments.

Referring now to FIG. 4, process flow 400 illustrates one possible method of configuring a computer system (e.g., computer device 100) and a secure removable storage device (e.g., 250 and 255) according to some disclosed embodiments. Because of requirements of law enforcement policies and procedures, access to and modification of data collected in the line of duty must be strictly controlled. One example requirement is that a "chain of custody of evidence" must be maintained. Chain of custody of evidence, in legal contexts, refers to chronological documentation or audit trails, showing the seizure (e.g., recording), custody, control, transfer, analysis, and disposition of physical or electronic (e.g., digital video/audio data) evidence. When evidence may be used in court to convict persons of crimes, it must be handled in a careful manner to avoid later allegations of tampering or misconduct which may compromise the case. Audit logs may, for example, contain an itemized list documenting access and/or alteration of any recorded potential evidence information whether by a user or additional computer system. The disclosed secure removable storage devices (e.g., 250 and 255), in conjunction with other aspects of law enforcement computer systems, may be used to assist in maintaining a proper chain of custody of evidence. Beginning at block 405, a storage device such as storage devices 250 and 255 may have its firmware updated or receive additional firmware instructions such as being programmed with an "unhidden key" and optionally decryption information. The decryption information mentioned here relates to the function of decrypting the "unhidden key" and may or may not relate to encryption of any other data on the secure storage drive or possibly a self-contained secure storage drive. At block 410, a computer device (e.g., computer device 100 of FIG. 1) may have its device driver augmented or replaced such that the device driver may supply one or more defined "unhidden key(s)" upon detection of a storage device. In one example embodiment, the device driver supplies the "unhide" information in encrypted form to further enhance security of the unhide information itself. At block 415, the unhide instructions (or the updated device driver itself) may be "locked" to a specific computer device. Locking this information to a specific computer device may further protect against copying of the device driver and unhide information to a different computer device than the one that has initially been configured for access to a corresponding storage device. Locking of the device driver and/or unhide information to a particular computer device may be performed by ensuring that the command(s) associated with providing the unhide information (e g, unhide key) only function properly after having verified an attribute of the computer system at execution time. For example, the command(s) to provide the unhide key may check one or more of: a Central Processing Unit Identifier (CPUID), a media access control (MAC) address of a network card associated with a computer system, or some other unique or predetermined attribute of the computer system. At block 420, the unhide information may be further configured to optionally include additional authentication information prior to allowing access to a secure storage device (e.g., 250 and 255). The additional information may include user identification (UID), user group identification (GID), or the like. In this example embodiment, a secure storage drive will only become unhidden when plugged into (e.g., connected to) a computer device (or computer system) that has the proper unhide information and only while a proper user is authenticated to the computer device. This may prevent, for example, access to information on a secure storage drive from a properly configured computer device by an improper user. Such two-factor authentication thus requires that both the storage device and the officer pass authentication (i.e. the officer is a proper user) prior to the secure storage drive becoming "unhidden" and accessible.

As explained above, a device driver on a computer device such as computer device 100 may be augmented or replaced to include additional or altered instructions to provide the disclosed unhide information. The device driver may be altered by changing instructions internal to the original device driver, by providing an altered dynamic load library (DLL), by installing a new device driver, or by many other implementation specific methods. This disclosure does not confine itself to any one method of implementation for updating a computer system to have a device driver enabled to provide the appropriate unhide information. Additionally, augmentation of a device driver on a computer device may include providing multiple different combinations and permutations of unhide information for a single computer device. That is, a single computer device may be configured to be able to access and unhide a plurality of different secure storage drives based on properly providing any required secondary authentication information (e.g., UID, GID).

Figure 5:
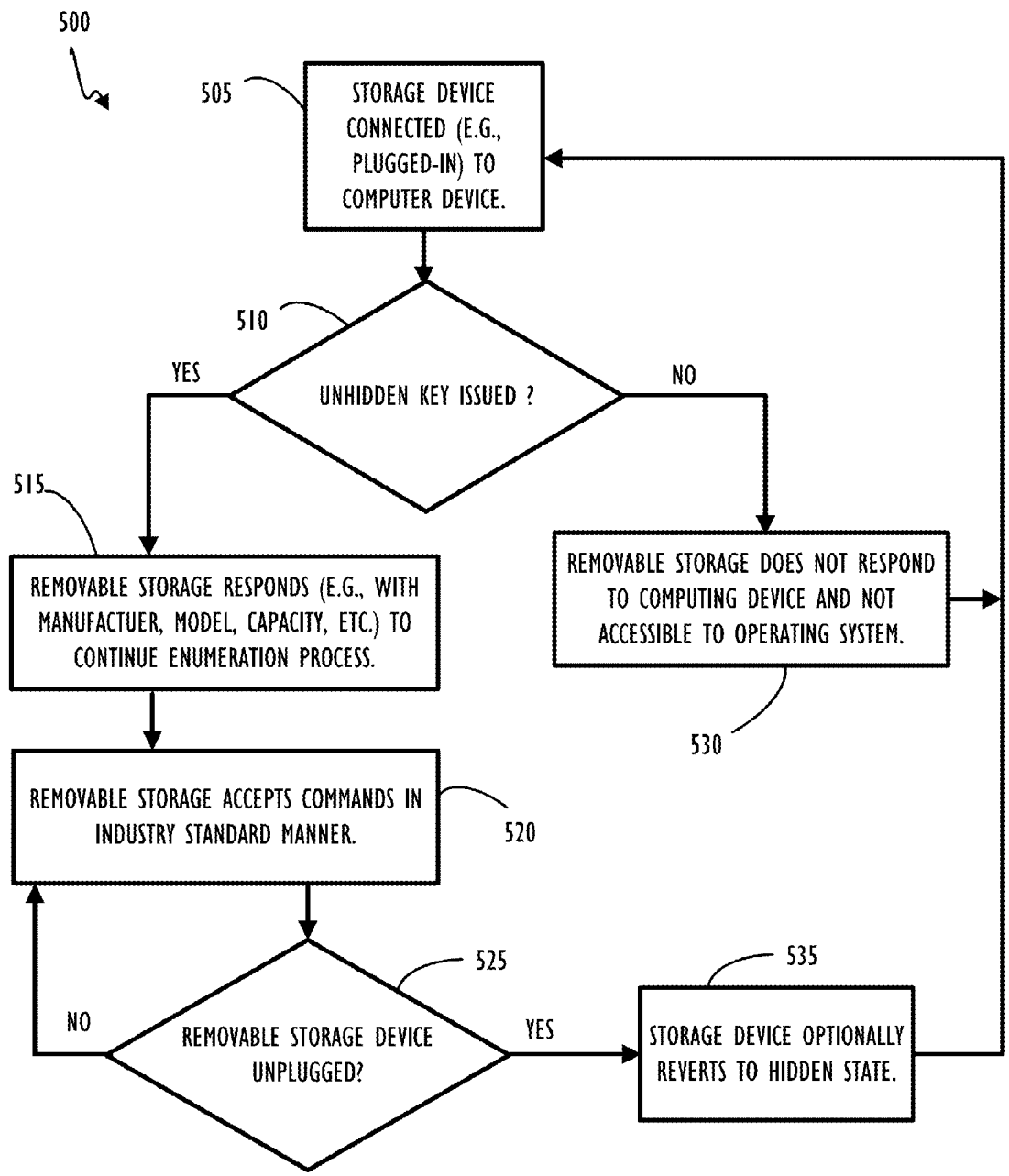
FIG. 5 illustrates a possible process flow to authenticate a computer device and a removable secure storage drive according to some disclosed embodiments.

Referring now to FIG. 5, flow chart 500 illustrates a possible method for determining if any computer access should be permitted to a secure storage device (e.g., 250, 255). If allowed, access may use typical industry standard "plug-n-play" storage device protocols. Disclosed industry standard storage devices may include SD drives, SATA devices, SCSI devices, or any other type of device suitable for the many disclosed embodiments. By disabling access to a "secured" but otherwise industry standard plug-n-play storage device, protection may be extended beyond typical encryption of data or read-only access to data. For example, on a standard plug-n-play storage device, even if data on the device is encrypted and the content is not accessible, a "FORMAT" command may be able to erase the stored data. As explained above, such destruction of data may not be acceptable for law enforcement type data. The architecture of the apparatus, methods, and systems disclosed herein makes such unauthorized attempts to format a device impossible because the device remains hidden and not accessible. Accordingly, prevention of the ability to format a storage device and to destroy data on a storage device may be an advantage for disclosed embodiments of the secure storage drive used in conjunction with other systems such as the audio/video surveillance system for collecting legal evidence as described herein, as well as other applicable fields. Beginning at block 505, a plug in storage device is inserted into a port on a computer device (e.g., computer device 100 of FIG. 1, or computer device 601 of FIG. 6) (or connected via another means such as a bus). In typical operation, the device driver of the computer device would query the storage device and the storage device would respond with appropriate access protocols (see enumeration discussion above). However, a removable storage device configured in accordance with some embodiments of this disclosure may have specially configured firmware to prevent standard "hand shake" protocols (e.g., enumeration processes) from allowing access to the storage area of a secure storage device (e.g., 250, 255). At decision 510, it is determined by the specially configured firmware of the storage device if an unhidden key from the device driver of the computer device has been received by the storage device. The unhidden key and optionally proper additional authentication information is required to allow access to the storage area of the secure storage device (e.g., 250, 255) or to allow access from the operating system of the computer device (e.g., computer device 100 of FIG. 1, or computer device 601 of FIG. 6). If no unhidden key has been received at the secure storage device, the NO prong of decision 510, then the secure storage device (e.g., 250, 255) does not respond in such a way as to complete a proper enumeration. Thus, the operating system of the computer device (e.g., computer device 100 of FIG. 1, or computer device 601 of FIG. 6) will not recognize the secure storage device (e.g., 250, 255). Optimally, the operating system will not even inform a user via the user interface of the computer device that any type of device was plugged in. In any event, even rudimentary access to the secure storage device (e.g., 250, 255) will be prevented as shown at block 530. That is, even rudimentary access to information about the secure storage device (e.g., 250, 255) will not be allowed. Flow will return to block 505 as if no plug-n-play device was inserted into the port (or connected via another means such as a bus or cable) of the computer device (e.g., computer device 100 of FIG. 1, or computer device 601 of FIG. 6). Alternatively, an unhidden key may have been issued by the device driver of the computer device to allow initial access to the storage device (the YES prong of decision 510) and then allow access by the operating system of the computer device (e.g., computer device 100 of FIG. 1, or computer device 601 of FIG. 6). At block 515, the specially configured secure storage device (e.g., 250, 255) will respond to the operating system in a "normal" fashion with access information as required to complete the enumeration process and permit access, as allowed by other security measures, to data on the connected storage device (shown at block 520). At decision 525 it is determined if the storage device has been unplugged. If the storage device has been unplugged (YES prong of decision 525), flow continues to block 535 where the secure storage device (e.g., 250, 255) may revert to its default hidden state. Flow then returns to the initial condition of block 505. Otherwise (NO prong of decision 525), flow returns to block 520 and continued access is permitted as long as the device remains plugged in. Note that data on the storage device may be further encrypted or otherwise protected by additional methods including simple password protection, biometric access control, and so on. Additionally, in an "open" embodiment, if a typical removable storage device were plugged into the computer device, the computer device would simply ignore (and not require) the unhidden key and therefore be accessible to the computer device in the normal fashion. In a different "closed" embodiment the computer device and its device driver may not allow access to any removable storage that is not secure. That is, rather than allowing standard access as in the "open" embodiment, the "closed" embodiment would restrict access to only specially configured secure storage drives. The "closed" embodiment may be useful, for example, to deter transfer of data from the computer device to a non-secure storage device because data on the computer device may be access restricted.

According to some disclosed embodiments, the secure storage drive remains hidden unless the computer system issues a special unhide key (via a device driver) to unhide the storage volume. For example, to unhide the portion of the storage device containing data readable by an operating system of the computer device (e.g., computer device 100 of FIG. 1, or computer device 601 of FIG. 6). The special unhide key may be issued from a modified device driver incorporated into the computer device or may be an additional hardware feature of the plug-in port (e.g., port 130 of FIG. 1) for industry standard devices. If the computer device does not have the ability to issue the unhidden key, the secure storage drive will not respond to any queries from the operating system of the computer device—the secure storage device may be treated as if it does not exist. Thus, the files in storage device are not visible in any way to the computer device. In addition to the disclosed aspect of hiding the plug-in storage itself, the data files on the plug-in storage can be encrypted for further security file protection. As noted above, commonly used encryption methods are unable to prevent computer systems from accessing and deleting the files (e.g., through a system "FORMAT"). However, unlike traditional data encryption, the hidden volume method described herein not only protects data integrity but also eliminates any possibility of computers accessing the data without the unhidden key.

The hidden secure removable storage device and associated methods of operation described above with reference to FIG. 5 may be used as discussed for law enforcement information or to secure any sensitive information in any field, including, but not limited to, medical, financial, Social Security, Protected Health Information (PHI), and so on. Similarly, disclosed embodiments of self-contained storage drives, either standard drives or embodiments of the disclosed secure storage drive, may be utilized for law enforcement purposes or any field of use that may benefit from the advantages discussed with regard to self-contained storage drives (e.g., ease of use, ease of upgrade, etc.).

Figure 6:
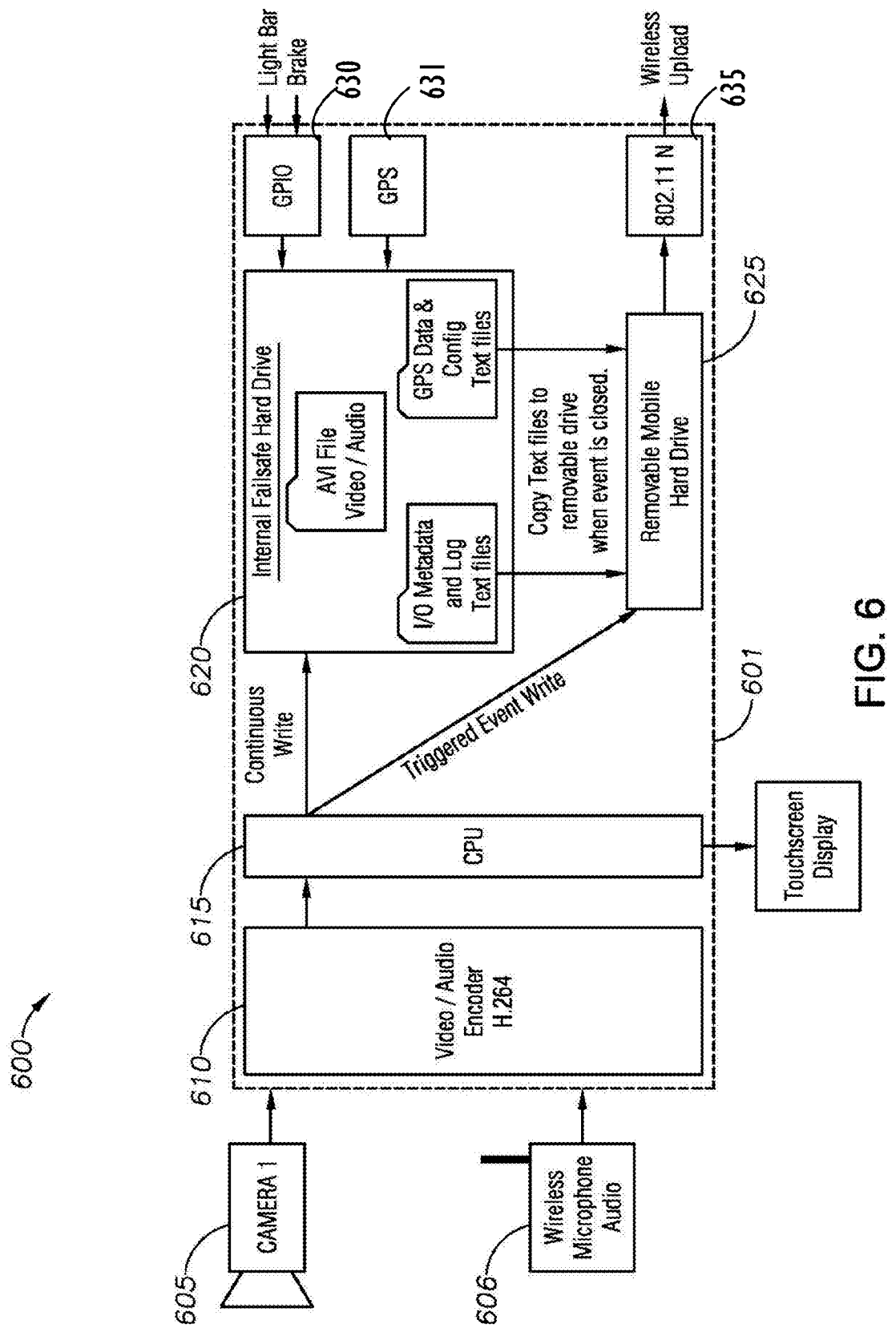
FIG. 6 illustrates a block diagram of an audio-video-data system that may be used, for example by law enforcement as a surveillance system, with one or more embodiments of the disclosed removable secure storage drive.

Referring now to FIG. 6, block diagram 600 illustrates different functional components of a surveillance system, such as an in-car audio/video digital video recorder, that may be used by law enforcement to collect evidence. One component of such a surveillance system typically includes a computer device (illustrated in FIG. 6 by dashed line 601) containing components similar to computer device 100 of FIG. 1. Note that each of the components shown in block diagram 600 may be communicatively coupled to other components via communication channels (e.g., bus) not shown in the block diagram. The flow arrows of block diagram 600 are very general in nature. In use, video and audio may be captured by camera 605 and microphone 606 respectively. Camera 605 and microphone 606 may be wired or wireless (e.g., body worn camera 1050 or wireless programmable microphone 1350 described below). Captured data may be provided initially to video/audio encoder 610 to encode and optionally compress the raw video data and the encoded data may be stored in a memory area (not shown) for access by CPU 615. Encoded data may also be selectively stored to either hard drive 620 or removable mobile hard drive 625 individually or to both simultaneously. Removable mobile hard drive 625 may be a secure storage drive such as 250 and 255. Data may also be transferred, for example at the direction of a user, from hard drive 620 to removable mobile hard drive 625. Data capture devices such as general purpose input output (GPIO) 630 and Global Positioning System (GPS) 631 may be used to capture metadata to associate with captured surveillance information. All pertinent captured metadata may be associated with captured video/audio recordings using structured text files such as, for example, eXtensible Markup Language (XML) files. In addition to captured metrics provided by real-time capture inputs, XML files may be utilized to store many different types of metadata associated with captured video and data. The types of metadata may include, but not be limited to, timestamps of capture, internal clock (not shown) of system 600 may be synchronized using GPS data, event tags, GPS coordinates, GPS and RADAR/LIDAR measurement from a target vehicle, analytical information and so on. Wireless interface 635 (or a wired interface (not shown) when available) may be used to upload information from one or more surveillance systems to back office servers located, for example, at a police station or to cloud based resources. The disclosed secure connectable storage device (e.g., 250, 255) may be used to protect and restrict access to the captured audio, video, and metadata as required by evidentiary rules followed by law enforcement.

Figure 7:
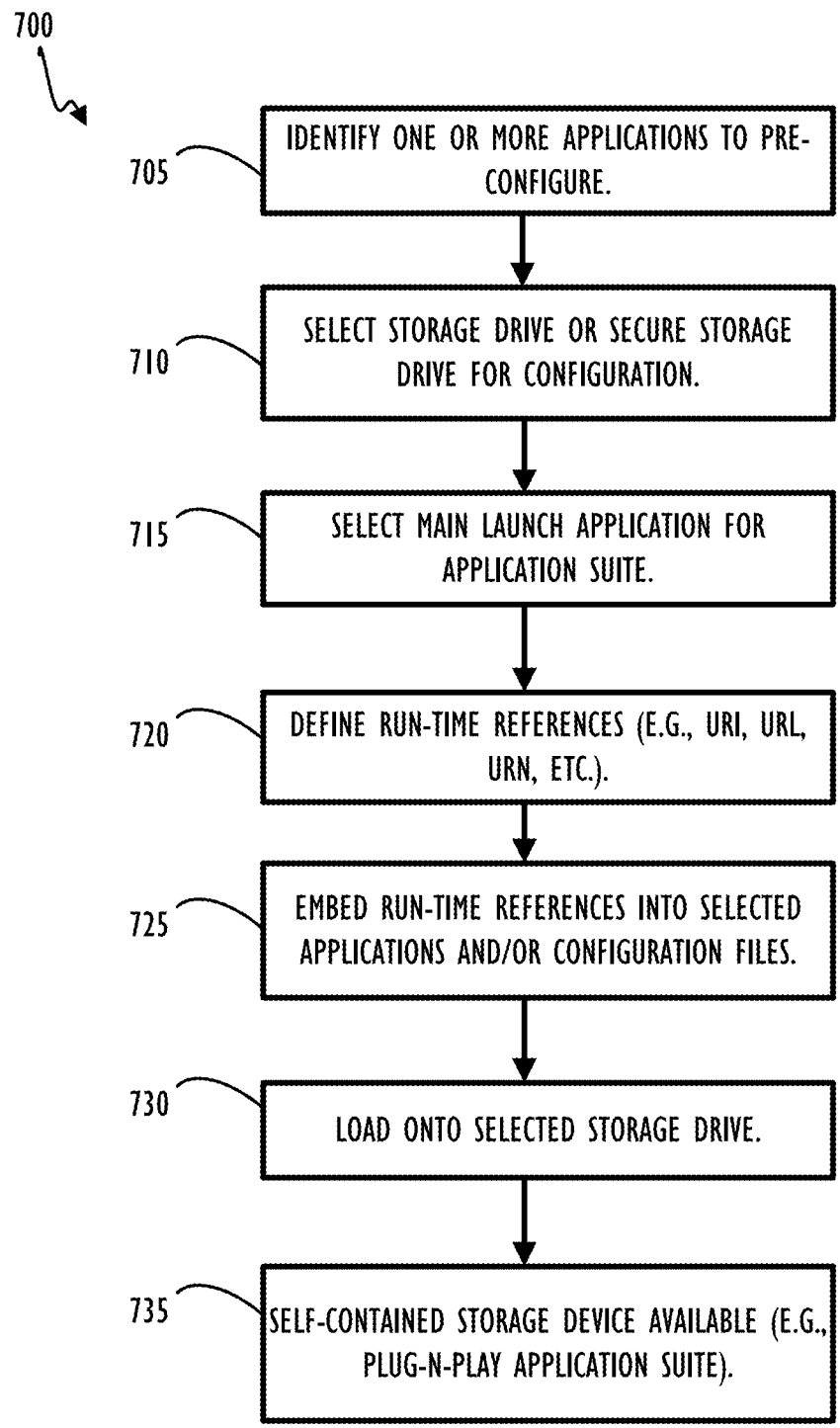
FIG. 7 illustrates a possible process flow to pre-configure a suite of applications for "self-contained" execution from a storage device according to some disclosed embodiments.

Referring now to FIG. 7, process flow 700 illustrates one possible method for configuring a self-contained storage device according to some disclosed embodiments. Beginning at block 705, one or more applications to pre-configure for self-contained execution may be identified. This identification may be in response to user defined requirements or based on a definition provided by a software architect, for example. The identified application or set of applications (e.g., application suite) may be identified to satisfy functional requirements, business need, etc. Next at block 710, a storage drive or a secure storage drive may be selected to contain the pre-configured application(s). This decision may be based on security requirements for access to the pre-configured applications or the data the pre-configured applications may have access to. For example, evidence information used in law enforcement may have stringent access requirements as discussed above. At block 715, a main launch application may be selected. For example, if the self-contained storage device has an application suite pre-configured there may be a single main application that a user would launch to gain access to functionality of the entire suite. Flow continues to block 720 where run-time references to secondary applications and configuration information may be defined to facilitate self-contained execution. Run-time references may be defined in a number of ways, for example, they may be defined using Uniform Resource Identifiers (URIs), Uniform resource locators (URLs), Uniform Resource Names (URNs), or other information. A URI can be a URL or a URN or a combination of both. In a simple example, a URN functions like a person's name while a URL resembles that person's street address. That is, the URN defines an item's identity, while the URL provides a method for finding that identity. At block 725, a software engineer, for example, may embed run-time references to resources (e.g., other applications, etc.) into selected applications and/or configuration files to allow for dynamic (e.g., run-time and/or real-time) resolution of an actual location for those resources. At block 730, a set of applications and/or configuration files that have been altered (i.e., pre-configured) to include run-time references as appropriate may be copied onto the selected storage drive. At block 735 the storage drive with all information required to be self-contained may function as a "plug-n-play" application suite. A plug-n-play application suite is another way of saying that a suite of applications are "self-contained" on a storage device in that they may be executed upon plugging in the storage device without requiring any kind of software application installation process on the part of the user. Clearly, this approach has advantages over prior art techniques because upgrading an application suite may be accomplished simply by plugging in a different storage drive.

Figures 8A, 8B:
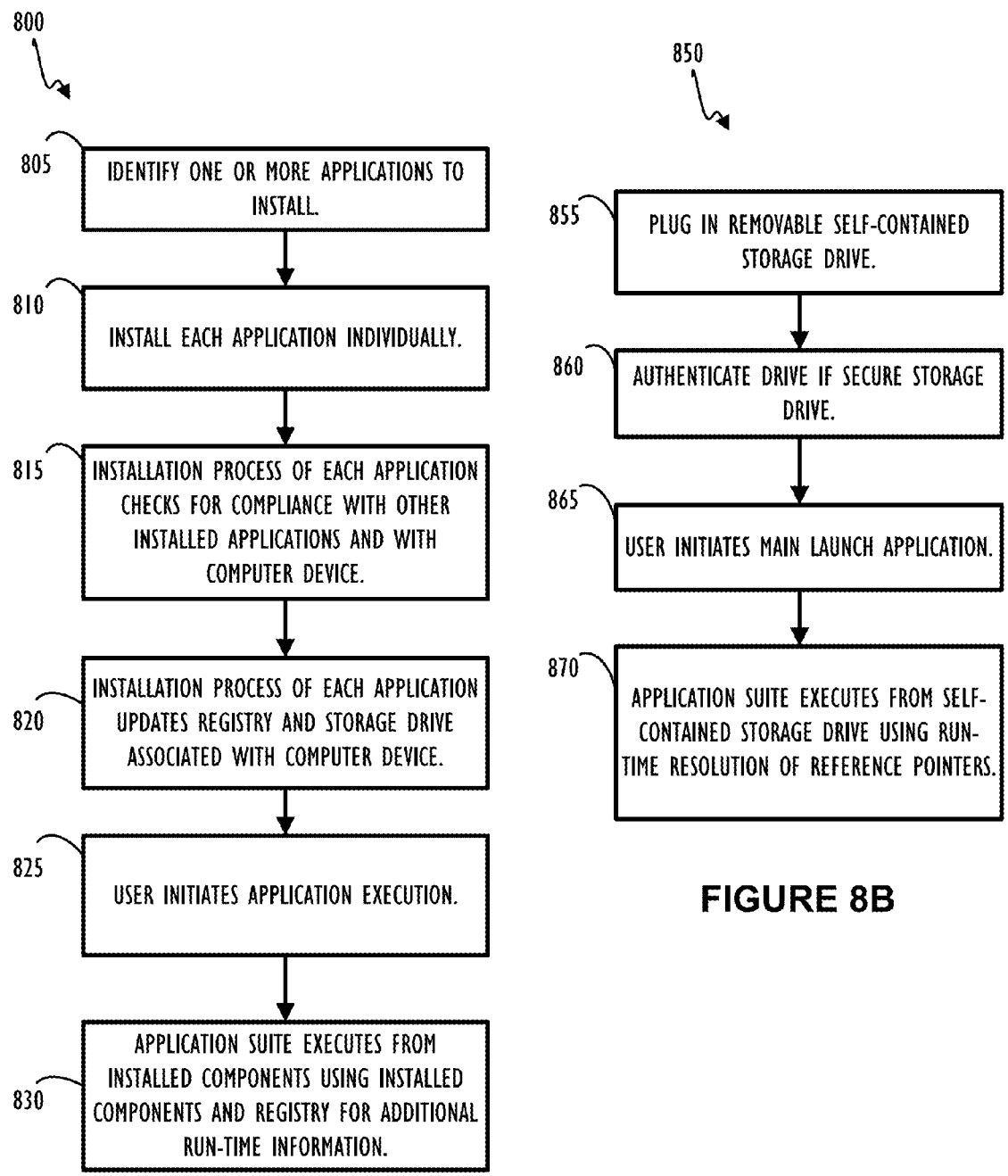
FIG. 8A illustrates one possible process flow for installation of one or more computer applications for execution on a computer system
FIG. 8B illustrates an alternative process flow illustrating that installation of applications may be bypassed using a self-contained storage device according to some disclosed embodiments.

Referring now to FIG. 8A, process 800 illustrates one possible flow for installation of one or more computer software applications for execution on a computer system. Beginning at block 805, one or more applications are identified for installation on a computer system/device (e.g., computer device 100 of FIG. 1 or computer device 601 of FIG. 6). Identification of applications in this example may be performed by a user, software architect, or technical support person, for example. At block 810 each identified application may be installed individually on an appropriate computer device. Block 815 indicates that the installation process of each application will likely check for compliance with other installed applications and capabilities of the computer device itself. That is, each installation process will attempt to prevent conflicts with other installed applications (as further discussed below) and make sure that hardware capabilities of the computer device support the application being installed. Conflicts between applications may occur because different applications may expect different versions of dynamic load libraries (DLLs) for proper execution. When multiple applications that are destined to be installed on a single computer device require different versions of a particular DLL a "catch 22" situation may exist because a computer device may be able to support only a single version of that specific DLL at one time. Thus, the application that is later installed will "win" and an earlier installed application may not function properly. This situation is sometimes referred to as "DLL Hell" because it is difficult, if not impossible, for a technical support person to resolve. "DLL Hell" is thus avoided through use of the self-contained storage device disclosed herein.

At block 820 each installation process may update the registry and storage drive (e.g., internal storage device) associated with the computer device. Block 825 indicates that after all identified applications have been installed on the computer device a user may attempt to initiate application execution. If all applications and application components properly completed their installation process without detecting or causing conflicts then the applications may function properly (the one or more applications execute correctly) using the installed components and registry for additional run-time information as indicated at block 830.

Referring now to FIG. 8B process 850 illustrates that installation of applications (as in process 800) may be bypassed by using a self-contained storage device according to some disclosed embodiments. Bypassing the installation process may prevent some of the above mentioned issues and in general simplify use of an application or application suite for a user. Beginning at block 855 a user plugs in a removable self-contained storage device configured in a manner identical to or similar to process 700 discussed above. At block 860 the computer device that is now connected to the removable self-contained storage device may optionally authenticate and allow access to (i.e., unhide) the storage device if the plugged in storage device is a secure storage drive. At block 865 the computer device has access to the standard or secure self-contained storage drive and a user may initiate execution of an application or application suite by simply causing the main launch application to execute. Note that it is possible to have more than one application that can perform as a main launch application on a single self-contained storage device. At block 870 the application or application suite executes from the self-contained storage device using its own pre-configured run-time resolution of reference pointers (as described for FIG. 7) and may not require any additional execution from applications previously installed on a different storage medium associated with the computer device. Additionally, applications on a self-contained storage device may not require access to or updating of a registry on the computer device for their proper execution.

Figure 9:
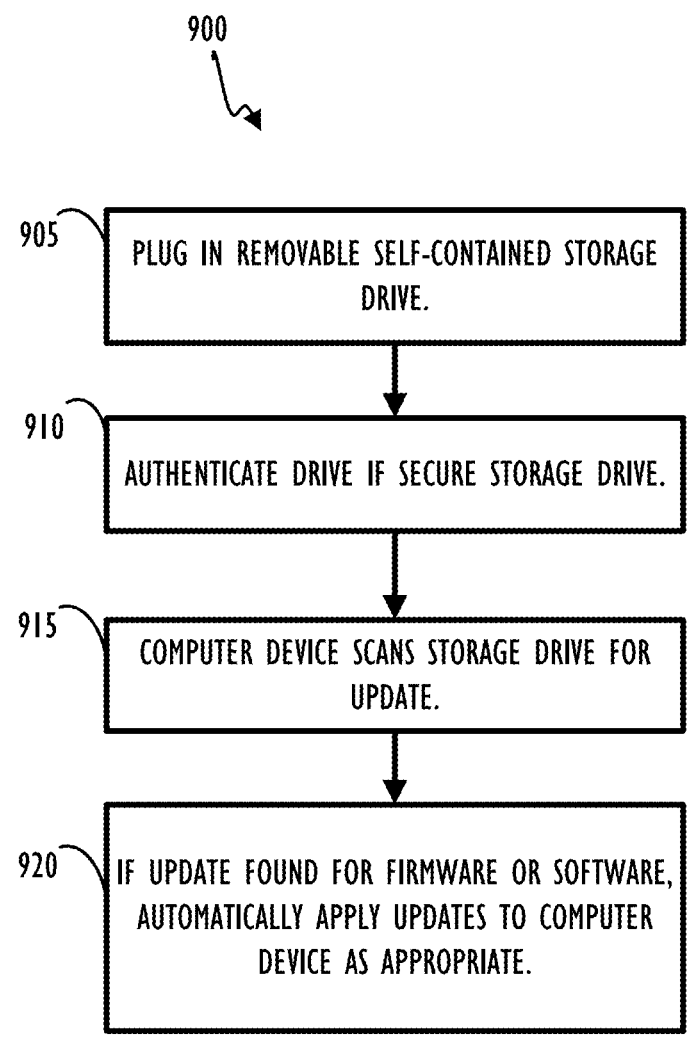
FIG. 9 illustrates a possible process flow for automatically updating firmware and/or software portions of a computer device prior to execution of applications from a "self-contained" removable storage device according to some disclosed embodiments.

Referring now to FIG. 9, process flow 900 illustrates one method of automatically updating firmware and/or software portions of a computer device prior to execution of applications from a self-contained removable storage device according to some disclosed embodiments. Beginning at block 905, a self-contained storage device, for example configured in accordance with process flow 700 as illustrated in FIG. 7, is connected to a computer device (e.g., computer device 100 of FIG. 1 or computer device 601 of FIG. 6). At block 910, the computer device that is now connected to the self-contained removable storage device may optionally authenticate and allow access to (i.e., unhide) the storage drive if the plugged in storage drive is a secure storage device (e.g., 250, 255). At block 915, the computer device automatically scans the storage device (e.g., storage device 150, 155 or secure storage device 250, 255) for possible updates. Note the computer device may be configured to scan any storage device that is plugged in to determine if there are available updates or may be configured to only scan for updates if a secure storage device (e.g., 250, 255) is plugged in. At block 920, the computer device may automatically apply updates to software and/or firmware of the computer device if updates are found during the scan. In this manner a computer device may be updated and kept more current (or consistent with any updates available on a self-contained storage device) without the user of the computer device having to install updates to the computer device. In one example, if the application suite on a self-contained storage device requires a specific version of firmware code (either older or newer) then that version of firmware code would be automatically installed on the computer device upon plugging in the self-contained storage device to ensure proper execution of applications from that self-contained storage device. Alternatively, scanning code can be designed to ignore any software and/or firmware updates on the storage device that are older than the software and/or firmware already installed on the computer device. These different implementation strategies are a design choice and may differ for different computer devices/systems.

With the above understanding of different embodiments of secure storage drives and self-contained application storage devices, we now discuss embodiments of portable cameras (e.g., body worn cameras 1050) to assist in comprehensive surveillance capabilities for companies or agencies, such as law enforcement. Note that disclosed embodiments of portable cameras are not limited to law enforcement and may be utilized by anyone desiring a portable surveillance system. For example, assistance personal at a retail outlet may be equipped with a portable camera to capture potential shop lifting evidence, or to record information for potential liability cases such as work related accidents, and so on. Many different uses of portable cameras configured according to the disclosed embodiments are envisioned.

A portable body worn camera (e.g., 1050) may have different requirements than an in car surveillance system for many reasons. For example, a body worn camera 1050 may not always have access to an additional power source (e.g., car battery) and will likely be substantially powered by a battery pack. In some embodiments, the disclosed portable camera 1050 may include a removable battery pack power source and an internal secondary "back up" power source. The internal power source will likely not be able to maintain functionality for a long time period and may provide enough time to allow the portable camera (e.g., 1050) to maintain operation (and data integrity) while a battery pack is exchanged for another battery pack, for example. Additionally, a body worn camera 1050 may have different size and weight constraints as compared to an in car surveillance system. These are just two examples of the many design choices that may be considered when distinguishing body worn cameras 1050 from other types of surveillance equipment and systems.

Figure 10A:
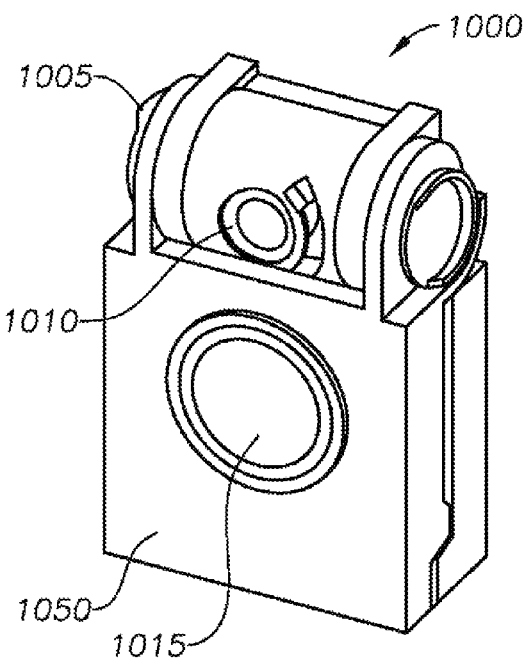
FIGS. 10A-C illustrate different views of one possible embodiment for a portable body worn camera according to some disclosed embodiments.
Figure 10B:
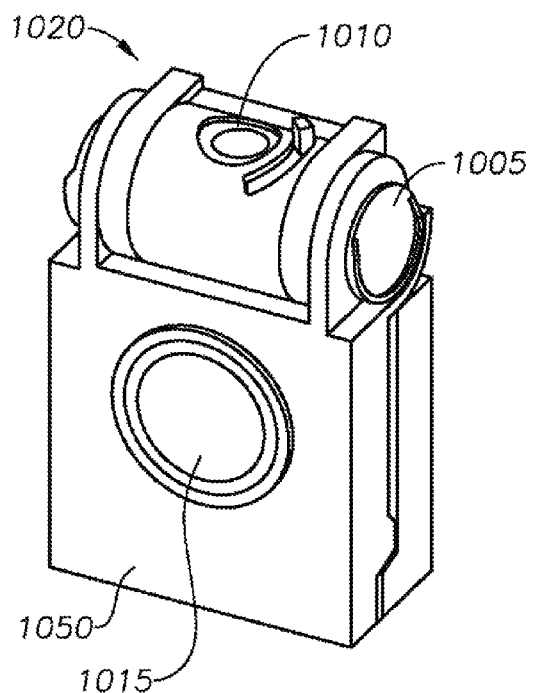
Figure 10C:
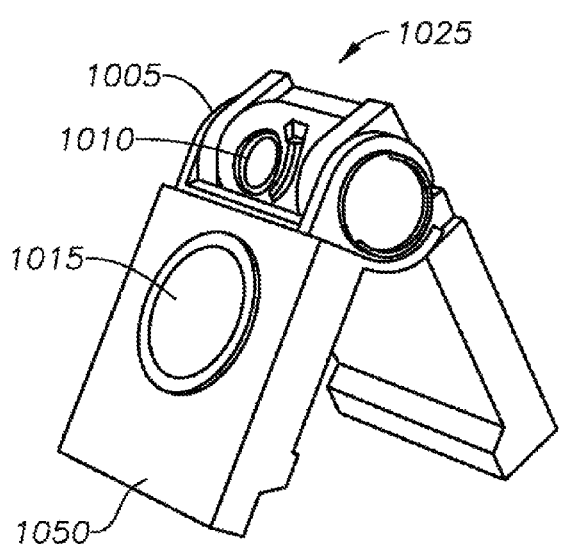
Figure 11:
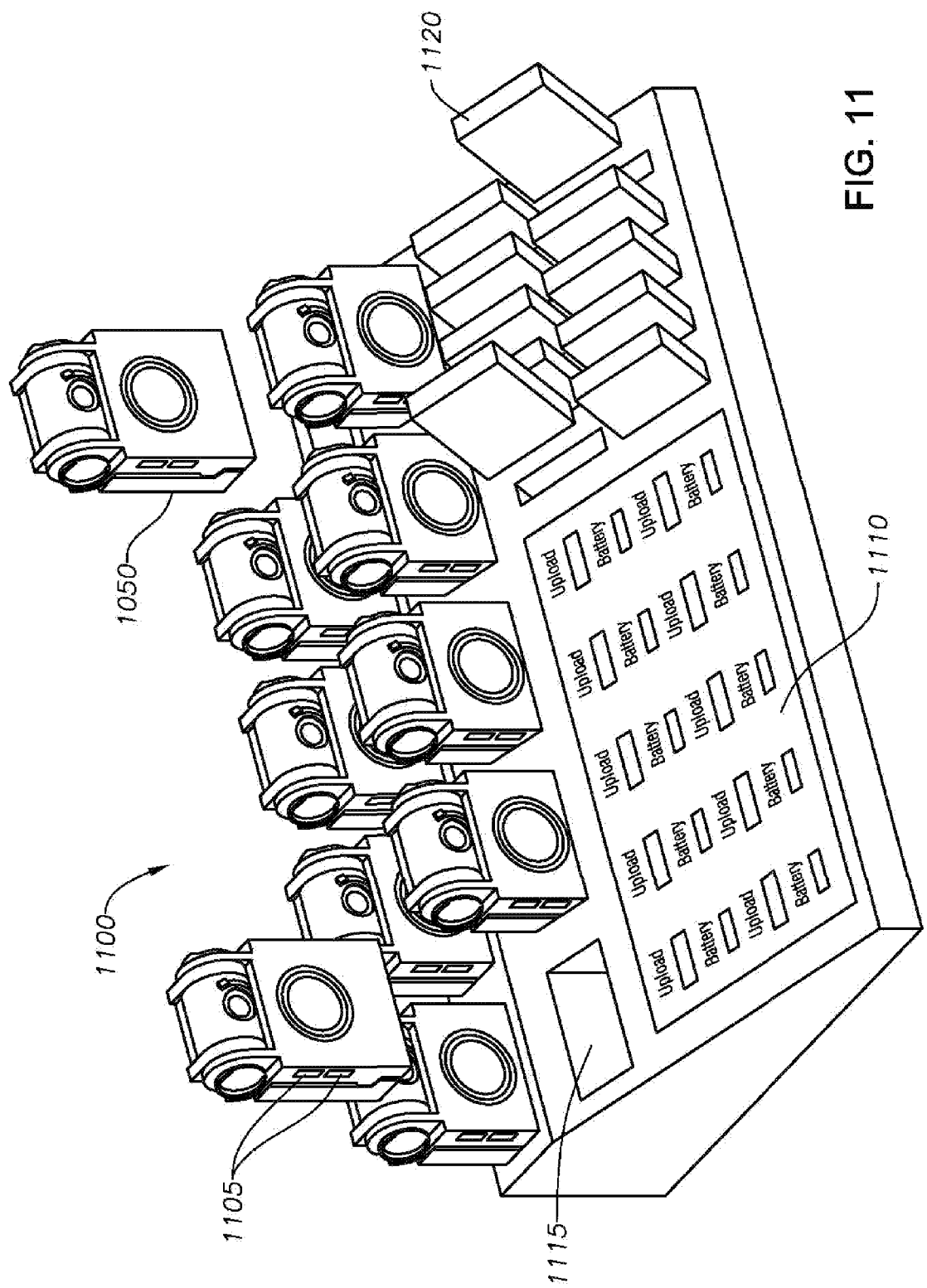
FIG. 11 illustrates an intelligent docking, upload, and charging station for battery packs and portable body worn cameras according to some disclosed embodiments.

Referring now to FIGS. 10A-C, views 1000, 1020, and 1025 in FIGS. 10A, 10B, and 10C, respectively, depict different aspects of disclosed embodiments of a body worn camera 1050. View 1000 illustrates that the camera portion (1010) may be mounted on a swivel bracket 1005 that may also act as a "hinge" as shown in view 1025. A directional microphone 1015 may, optionally, also be included to capture sounds from a direction consistent with the orientation of body worn camera 1050. Microphone 1015 may be an Omni-directional microphone with noise cancelling technology. Microphone 1015 may be utilized as a wireless microphone link communicating over any of the wireless communication technologies discussed herein or known in the art and potentially replace functionality that may be provided by remote microphones (e.g., programmable wireless microphone 1350 discussed below). Integrating this functionality into body worn camera 1050 may reduce the amount of equipment an officer must wear/carry. Accordingly, body worn camera 1050 may be configured to act in different modes as required, such as, audio only, video only, metadata only, control link only or any combination thereof. Body worn camera 1050 also may include programmable hard keys as shown in FIG. 11 element 1105 and described below.

Disclosed embodiments of a body worn camera 1050 may include one or more of the following additional features. A High Definition (HD) camera supporting different resolution recording modes (e.g., 4K, 1080P, 720P, etc.). A Liquid Crystal Display (LCD) or a Light Emitting Diode (LED) display along with or in addition to LED light indicators to indicate operational status of body worn camera 1050. An internal storage drive (optionally configured as the above discussed self-contained storage device and/or secure storage drive (e.g., 250, 255 of FIG. 2). Functionality of a self-contained storage device internal to embodiments of the body worn camera 1050 may provide the body worn camera 1050 with the same or similar functionality of the above discussed in car video system (see FIG. 6). Advanced functions may also include license plate recognition and/or facial recognition capability. Body worn camera 1050 may include multiple cameras of the same or different resolutions and may optionally connect to external cameras instead of or in addition to an integrated camera. For example, body worn camera 1050 may connect using wired or wireless technologies to a camera integrated or attached to a vest worn by a police officer. If configured with multiple cameras, body worn camera 1050 may simultaneously record multiple video streams (e.g., concurrently record and associate metadata with multiple video inputs). As with conventional video cameras, body worn camera 1050 may optionally operate in still photo mode, take still photos in rapid succession, or operate in other modes such as panorama.

Authentication of body worn camera 1050 and access to any internal recordings may require authentication of a secure storage drive (e.g., 250, 255 if so configured) and/or authentication of a user to the body worn camera 1050 device itself. Authentication of body worn camera 1050 may be accomplished using wireless communication interfaces or by physical contact with (e.g., cable connection, pogo pins, sync contacts, etc.) another previously authenticated device (e.g., 601). Authentication to body worn camera 1050 may also be assisted via, or be part of, a single sign-on process. The single sign-on process may be initiated on a different device and communicated to body worn camera 1050 via one if its communication interfaces (wired or wireless). Alternatively, a previously authenticated body worn camera 1050 may assist in authenticating a user to another device using a similar single sign-on process. That is, body worn camera 1050 may be an initiator or a recipient device in a single sign-on process. Communication interfaces for the disclosed body worn camera 1050 may include one or more of integrated broadband 3G/4G, Wi-Fi, Bluetooth, and RFID/NFC. Note that each of these interfaces, in particular, (radio frequency identification) RFID and (near field communication) NFC interfaces may be used for data exchange, device authentication, and/or device control. By using NFC (or short range RFID) secure authentication may automatically take place between two devices based on those two devices being brought within proximity of each other. One or more of video, audio, metadata, control communication, and/or streaming, may be configured to function over any available and compatible wireless communication interface in a bidirectional manner. That is, body worn camera 1050 may be remote controlled from another device or act as a remote control for another device (e.g., mobile surveillance system 601). As discussed in more detail below, disclosed embodiments of a body worn camera 1050 may include docking ports (see FIG. 11), USB ports, and record triggers that may initiate recording (of audio and video data simultaneously or individually) automatically based on events, signals, timers, etc. Record triggers may include signals from a wireless heart rate monitor (possibly embedded in a watch worn by the user of the body worn camera 1050) or monitors to detect removal of a gun/taser/club from its holster, for example. These sensors and/or triggers may communicate with body worn camera 1050 using any of the above discussed wireless communication protocols, for example.

Other ports on a body worn camera 1050 may include charging ports/plugs and vehicle or office docking ports to plug into a docking station (e.g., docking station 1100 of FIG. 11) or provide system expansion, for example. Disclosed embodiments of a body worn camera 1050 may also include a GPS for providing location and time synchronization information as well as an accelerometer to determine camera orientation. The integrated GPS may be used to coordinate data for map trace functions as well as officer position data by sending a periodic beacon or other types of data transmissions directly to a remote location via the integrated broadband or relay through a vehicle radio, Wi-Fi or broadband data link. These and other sensors may also be used to detect gunshots, abrupt motion of the camera that may be caused by an accident (e.g., car accident) or fall of the person wearing the camera device (e.g., body worn camera 1050), and other indications of possible distress. In these instances, recording may be initiated, or if already initiated (or after automatic initiation) a recording (including audio and video streams) may be automatically tagged with an incident tag indicative of the type of incident detected. Body worn camera 1050 may maintain a Bluetooth or other wireless connection with an in car system while the body worn camera 1050 is in use to facilitate streaming of captured information to another location or to automate upload of recorded data to a secondary device, for example. Programmable hard key buttons (e.g., 1105 of FIG. 11) and soft buttons on a touch screen (not shown) of body worn camera 1050 may be incorporated to allow users to define one button operational modes for body worn camera 1050. Some embodiments of the disclosed body worn camera 1050 may also be configured to monitor for and accept voice commands. The voice commands may be used for authentication using voice recognition prior to accepting other commands. Voice recognition may also be required prior to (or in conjunction with) allowing additional authentication of the body worn camera 1050.

Referring now to FIG. 11, advanced docking station 1100 may provide additional benefits for users that maintain a plurality of portable body worn cameras (1050) and may assist in data upload, device checkout, device upgrade (e.g., firmware/software update), recharging of battery packs 1120 and other maintenance type functions that may be performed, for example, at a police station. For clarity, not all repeated elements in FIG. 11 have an associated reference number. Embodiments of the disclosed docking station may support maintenance functions for multiple body worn cameras (1050) concurrently. Note that FIG. 11 illustrates two hard key programmable function keys 1105 for body worn camera 1050 that were not visible in the views of FIGS. 10A-C. The disclosed docking station 1100 may be multifunctional for uploading and/or downloading of video/audio and associated metadata. Configuration data such as unit ID, user ID, operational modes, updates, and so on, may be maintained and versions of such configuration information may be presented on display screen 1110 (which may also be a touch screen interface to docking station 1100).

Docking station 1100 may have integrated interfaces to portable camera 1050 such as, USB, wired Ethernet or wireless network, as well as interface ports for battery charging. Docking station 1000 may also contain: a CPU and be configured as a computer device (see FIG. 1) optional integrated touch screen display 1110, output connectors (not shown) for an optional external display/mouse or device expansion. Docking station 1100 may have an option for a wireless display (not shown) to be used for status indication as well as for an interface for checkout/assignment of the smart wearable device to a user or group of users. Docking station 1100 may include wireless communications such as Bluetooth and/or 802.11AC/AD. Docking station 1100 may be configured to work as an Access Point for a wireless network or may be configured to act as a bridge to allow portable client devices to access functionality of docking station 1100 and possibly connect to other system components including local or cloud based servers.

Embodiments of docking station 1100 may be configured to interface with tablets or smart phones as a user interface to provide for full remote functionality. As shown in FIG. 11, docking station 1100 may have multiple ports/cradles (1115). As an example, docking station 1100 may have a "5 bank" or "10 bank" of ports/cradles (1115). Multiple docking stations such as docking station 1100 may be stacked or daisy chained together as one possible expansion mechanism.

Docking station 1100 may also have an internal storage device to facilitate fast off-load storage to facilitate a download/forward process for audio/video and data captured on the portable device. For example, the user may place the wearable or portable recording device (e.g., body worn camera 1050 or programmable wireless microphone 1350) into docking station 1100 and docking station 1100 offloads the data to the local onboard storage drive (not shown) which can immediately (or based on a timer) upload that information to a server (e.g., back office server or cloud storage). Uploads could be prioritized based on many different attributes such as time, size, event type, priority, and so on. Docking station 1100 may also have an integrated locking mechanism for one or more of the uploading/charging ports/cradles (1115). The docking station 1100 may be configured to control the locking mechanism to hold or release the wearable device in order to prevent the user from taking it out during uploading/downloading, or to make sure that only the recently "checked out" device is removed, for example.

The touch screen display 1110 of FIG. 11 illustrates one possible graphical user interface (GUI) layout as an example only. Actual layouts may contain more information and features and may be configurable based on requirements of different end users. In FIG. 11, the GUI shows examples of upload status and battery charging progress. Other screens may be available on the GUI display 1110 to provide other status information such as unit ID, user ID, and/or to assist with user checkout and assignment of devices to different mobile surveillance systems. Recall, that a secure storage device (e.g., 250 or 255 of FIG. 2) that may be integrated into portable camera device 1050 may only become "unhidden" when they are "connected" to an appropriate computer device such as a specific patrol unit having an associated mobile surveillance system 601 of FIG. 6. As explained above, these types of controls may be necessary to facilitate compliance with chain of custody of evidence requirements.

Figure 12:
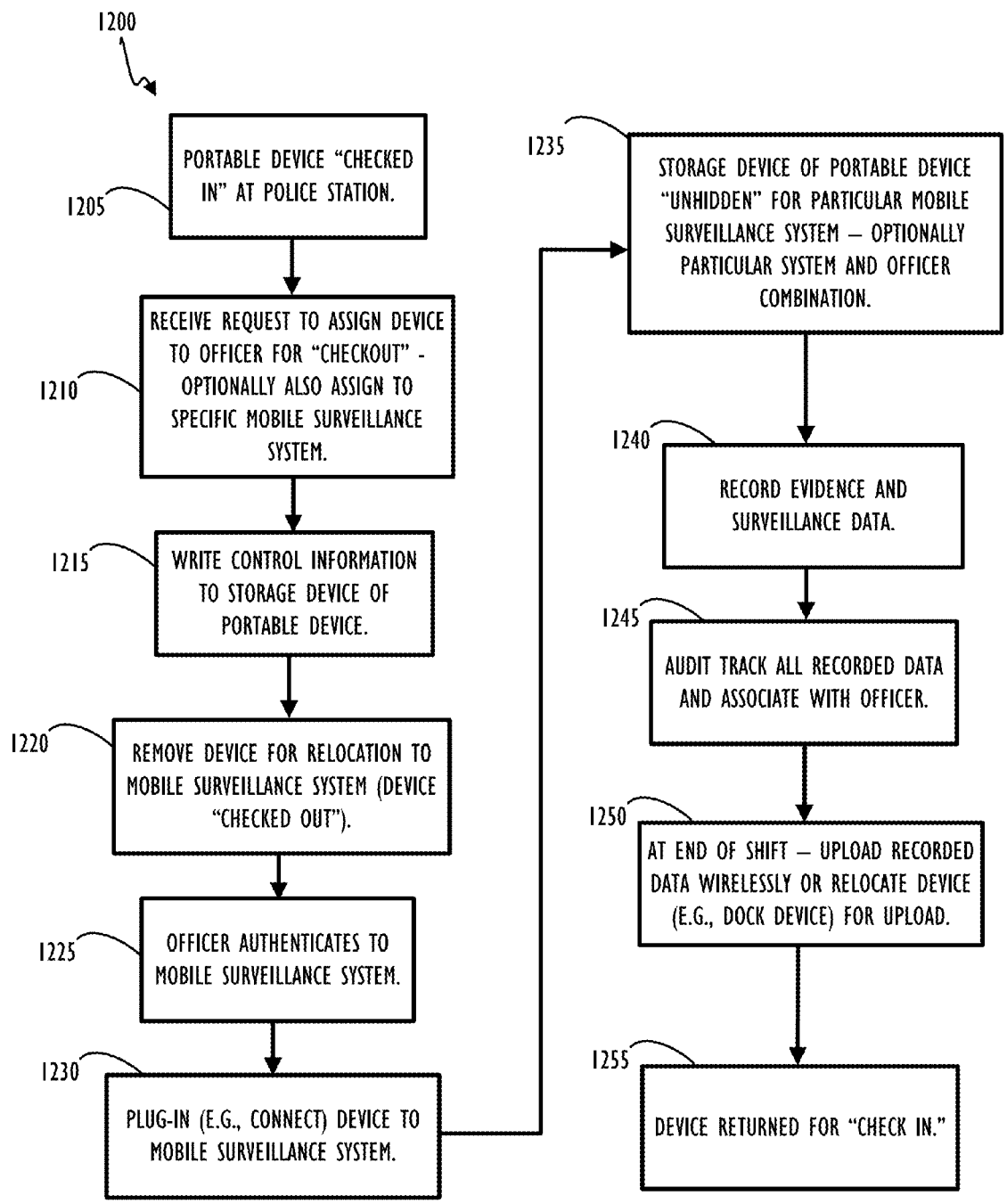
FIG. 12 illustrates a possible process flow to "checkout" a portable device (e.g., body worn camera) including a storage device (possibly a secure storage drive), the portable device may be used by specific law enforcement personnel for the duration of checkout and assist in chain of custody procedures according to some disclosed embodiments.

Referring now to FIG. 12, process flow 1200 illustrates a possible method for assisting law enforcement personnel with compliance of chain of custody of evidence requirements for legal evidence collected on a portable recording device such as body worn camera 1050 or programmable wireless microphone 1350 (described with reference to FIG. 13 below). Chain of custody of evidence requirements may be implemented with the assistance of docking station 1100. In this example, the computer device at the police station is considered to be docking station 1100 (but could be another workstation type device for example) and a computer device in a police car, for example, will be referred to as a "mobile surveillance system." Both docking station 1100 and the mobile surveillance system are examples embodiments of computer device 100 of FIG. 1 described above. Also, in this example the storage device may be referred to as a secure storage drive in certain situations, however, aspects of this example are clearly applicable to a standard storage device and may be beneficial independently of a specially configured secure storage drive. Beginning at block 1205, a portable device (e.g., 1050, 1350) including a storage device (e.g., secure storage device 250, 255) is "checked in" at a police station, for example. In the "checked in" state the portable device (e.g., 1050, 1350) may be connected to docking station 1100 that is configured to interact with the storage device in an "unhidden" manner. That is, docking station 1100 may be configured with the required information explained above to allow access by the operating system to a secure storage drive integrated into one or more portable recording devices (e.g., 1050, 1350). At block 1210, docking station 1100 receives a request to assign a portable recording device (e.g., 1050, 1350) to an officer (e.g., Officer "Joe Smith") for use in a patrol "shift." The request may, for example, come from a GUI presented on touch screen 1110. Optionally, the request may also include information to assign the storage device and associated portable recording device (e.g., 1050, 1350) to a particular mobile surveillance system for that shift (e.g., surveillance system of "patrol car 54"). At block 1215, docking station 1100 writes control information to the storage device of portable recording device (e.g., 1050, 1350) to identify an appropriate mobile device (e.g., 601). The control information may include storage serial number, officer's ID (e.g., "Joe Smith"), patrol car (e.g., "54"), officer's password (likely encrypted), recording parameter settings, or other information useful in assisting in audit tracking of the portable device (e.g., 1050, 1350) and any information collected on the storage device of the portable device (e.g., 1050, 1350) during the shift. At block 1220, the portable device (e.g., 1050, 1350) is removed from docking station 1100 for association with a mobile surveillance system (e.g., 601). The portable device (e.g., 1050, 1350) is now in a "checked out" state.

At block 1225, the officer authenticates to a mobile surveillance system. The storage device is plugged in (e.g., connected by connecting the portable device (e.g., 1050, 1350)) to the mobile surveillance system at block 1230. Flow continues to block 1235 where the storage device of the portable device (e.g., 1050, 1350), if a secure storage device (e.g., 250, 255), is unhidden. Clearly, a secure storage drive will only become unhidden if the mobile surveillance system is configured to properly authenticate to the secure storage drive of the portable device (e.g., 1050, 1350). Authentication requires the mobile surveillance system be pre-configured to access this particular secure storage drive using "unhide information" as described above and may optionally only unhide after a second check that a proper officer has authenticated to the mobile surveillance system. That is, both the secure storage drive in the portable recording device (e.g., 1050, 1350) is associated with a proper surveillance system (e.g., 601), and the authenticated user will be validated as a proper user prior to allowing any access to the secure storage drive of the portable device (e.g., 1050, 1350) from the mobile surveillance system. Thus, as an example, Officer "Joe Smith" is authenticated to the mobile surveillance system and the mobile surveillance system is the one in patrol car 54, that Officer Smith should be using for his shift. Such increased authentication methods may assist in compliance with chain of custody of evidence requirements for gathering and maintenance of evidence.

At block 1240, as the officer performs his shift duties (e.g., goes on patrol, etc.) the mobile surveillance system records and stores evidence and surveillance data onto the storage device of the portable device (e.g., 1050, 1350). During the shift, all data recorded on the storage device may be associated with the officer for audit tracking purposes as indicated at block 1245. For example, a metadata file may be used to "mark" any recorded data with officer's ID, event type, date/time, GPS location, etc. Block 1250 represents actions that may take place at the end of a shift, for example. After a shift is completed and the officer and mobile surveillance system return to the police station, recorded data may be securely (for example, but not limited to, by data encryption) uploaded wirelessly to a back office system at the police station. Securely uploaded, as used here, indicates that the recorded data will be uploaded in a manner as to maintain its association with the officer and maintain chain of custody of evidence requirements as well as any other type of security regarding the wireless network, etc. As an alternative to wireless upload, the officer may remove (e.g., disconnect) the portable device (e.g., 1050, 1350) and relocate the storage device to the same or a different docking station 1100 for upload at the police station. Clearly, a different docking station 1100 would also need to be properly configured to access the storage device of a portable device (e.g., 1050, 1350) if it is a secure storage device (e.g., 250, 255). At block 1255, the officer may "check in" the storage device so as to allow a different officer to use it on a subsequent shift, for example by using a GUI interface to docking station 1100. Note that some law enforcement agencies require a two-factor authentication for access to data. Validating "unhidden information" regarding both the storage device and the authenticated officer (e.g., both the association with the surveillance system of patrol car 54 and confirming Officer Smith is logged into that system) is one example of two-factor authentication.

Figure 13A:
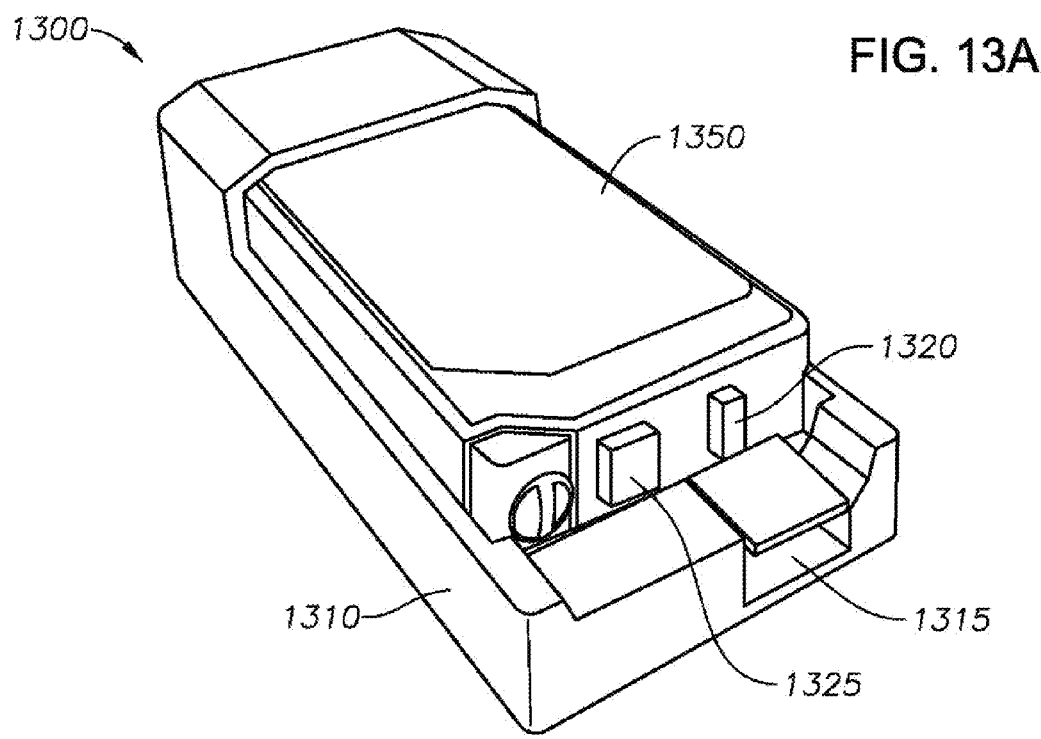
FIGS. 13A-B illustrate different views of one possible embodiment for a portable wireless programmable microphone including internal storage according to some disclosed embodiments.
Figure 13B:
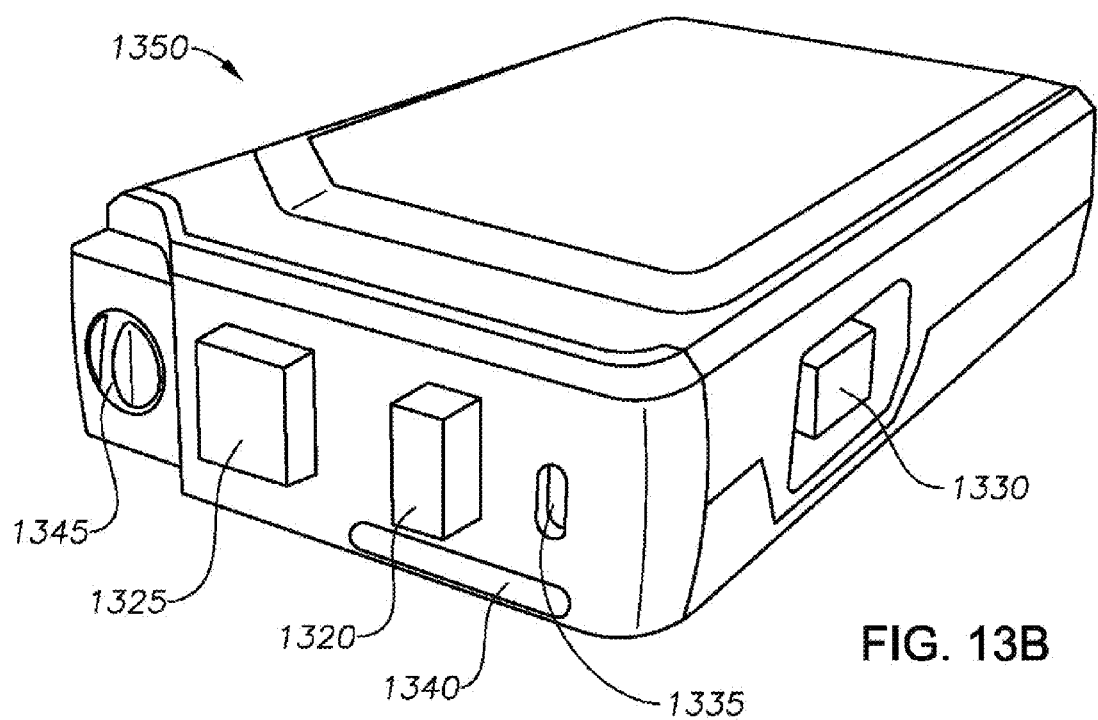

Referring now to FIGS. 13A-B, FIG. 13A illustrates view 1300 depicting a programmable wireless microphone 1350 and an associated single bay charging station 1310. Charging station 1310 includes a single locking clip 1315 (although, it is contemplated that multiple locking clips or other securing means may be used) to securely hold programmable wireless microphone 1350. Clearly, docking station 1100 described above may be configured to bays (not shown) configured to accept one or more programmable wireless microphones 1350 instead of or in addition to bays configured to accept body worn camera 1050. These bays for programmable wireless microphone 1350 may provide similar charging, upload, locking, etc. functions as those described above for body worn camera 1050. FIG. 13B illustrates programmable wireless microphone 1350 from a different perspective view. Programmable wireless microphone 1350 may include an internal microphone 1335. Additionally, programmable wireless microphone 1350 may include a plug-in directional microphone (not shown) that has the ability to capture sounds from a direction consistent with the orientation of the directional microphone. Alternatively a microphone (e.g., 1335) may be an Omni-directional microphone with noise cancelling technology. In an additional embodiment, programmable wireless microphone 1350 may include a plug-in lapel microphone with inline control functions (e.g., buttons on cable) to allow easy access when programmable wireless microphone 1350 is worn under a jacket, bullet-proof vest, or other clothing, for example. As seen in FIGS. 13A-B, wireless programmable microphone 1350 includes programmable buttons 1320, 1325, and 1330. These buttons may optionally include LED illumination to indicate "status" while in operation. For example, the LED illumination may change color when out of range versus when streaming to an associated base device. The LED illumination may also indicate if local recording is taking place, power status (e.g., on/off), battery status (e.g., fully charged, half charge, etc.), or other information. Of course, LED indicators (or something comparable) may be included that are not included in a button and the number and size of any indicator may vary based on need. Programmable wireless microphone 1350 may also have an integrated display (such as, Liquid Crystal Display (LCD) (not shown) to provide operational status and other information. Clip receptacle 1340 is shown in FIG. 13B. Antenna 1345 may be included to support one or more of the integrated wireless communication interfaces (e.g., Bluetooth, NFC, RFID, 802.11, other radio frequency (RF) transmission).

In some embodiments, programmable buttons (e.g., 1320, 1325, and 1330) may be configured to control functional characteristics of programmable wireless microphone 1350. Programmable buttons (e.g., 1320, 1325, and 1330) may optionally initiate sending control information via one or more wireless communication interfaces to one or more associated surveillance system devices (e.g., mobile surveillance system 601). Additionally the multiple programmable buttons (e.g., 1320, 1325, and 1330) may be configured to support features such as mute, trigger recording on the backseat camera, blackout the display, lock the system, trigger emergency alert, voice recorder, etc. Programmable wireless microphone 1350 may also be configured to receive control commands via its wireless communication interfaces. Thus, a bi-directional communication link may be established between programmable wireless microphone 1350 and other surveillance system devices. Of course, bi-directional communication links may be established to allow communication between programmable wireless microphone 1350 and headquarters, command centers, other vehicles etc. Communications to distant locations may be facilitated by using another device (e.g., in car system 601, cell tower, etc.) as an intermediary for relaying the transmissions.

Authentication of programmable wireless microphone 1350 and access to any internal recordings may require authentication of a secure storage drive (e.g., 250, 255 if so configured) and/or authentication of a user to programmable wireless microphone 1350 itself.

Authentication of programmable wireless microphone 1350 may be accomplished using wireless communication interfaces or by physical contact with (e.g., cable connection, pogo pins, sync contacts, etc.) another previously authenticated device (e.g., 601). Authentication to programmable wireless microphone 1350 may also be assisted via, or be part of, a single sign-on process. The single sign-on process may be initiated on a different device and communicated to programmable wireless microphone 1350 via one if its communication interfaces (wired or wireless). Alternatively, a previously authenticated programmable wireless microphone 1350 may assist in authenticating a user to another device using a similar single sign-on process. That is, programmable wireless microphone 1350 may be an initiator or a recipient device in a single sign-on process. Communication interfaces for programmable wireless microphone 1350 may include one or more of integrated broadband 3G/4G, Wi-Fi, Bluetooth, and RFID/NFC. Note that each of these interfaces, in particular, (radio frequency identification) RFID and (near field communication) NFC interfaces may be used for data exchange, device authentication, and/or device control. One or more of audio, metadata, control communication, and/or streaming, may be configured to function over any available and compatible wireless communication interface in a bidirectional manner. That is, programmable wireless microphone 1350 may be remote controlled from another device or act as a remote control for another device (e.g., mobile surveillance system 601). As discussed in more detail above, disclosed embodiments of programmable wireless microphone 1350 may include docking ports (see FIG. 11), USB ports, and record triggers that may initiate recording automatically based on events, signals, timers, etc. Record triggers may include signals from a wireless heart rate monitor (possibly embedded in a watch worn by the user of programmable wireless microphone 1350) or monitors to detect removal of a gun/taser/club from its holster, for example. These sensors and/or triggers may communicate with programmable wireless microphone 1350 using any of the above discussed wireless communication protocols, for example.

As briefly mentioned above, programmable wireless microphone 1350 may include an internal (or plugged in) storage drive (possibly secure storage drive e.g., 250, 255) to store captured audio information. Programmable wireless microphone 1350 may be configured to automatically stream captured audio information and associated metadata to another device (e.g., mobile surveillance system 601) using any of its configured wireless interfaces and may simultaneously record and stream. Alternatively, programmable wireless microphone 1350 may only store collected information locally when streaming capability is not available or determined to be unreliable (e.g., out of range, bad connection, etc.). Data stored locally may be time stamped using an internal clock or information from a GPS and later synchronized with other recording devices. GPS may also provide location data that may be used to coordinate data and map based search in addition to the aforementioned time synchronization. Programmable wireless microphone 1350 may be configured to have an internal pre-record buffer either stored on an associated storage drive or stored in additional internal memory. A user or administrator may define a record duration for the pre-record buffer and information in the memory associated with the pre-record buffer may be utilized using a circular queue mechanism. Programmable wireless microphone 1350 may also have an option to store audio only local recordings such as voice memos initiated by a user. Local recordings may also be reviewed using an ear phone port (not shown) for example. It is noted that capabilities of programmable wireless microphone 1350 and body worn camera 1050 may be integrated into a single comprehensive device configured to perform some or all of the functions described for each device above.

With the above understanding of different disclosed embodiments, an example scenario of use is presented here. This example is not intended to be limiting in any manner and is provided to illustrate a context for using and benefiting from the many different possible aspects of a self-contained storage drive integrated into a portable camera (e.g., 1050) or a wireless programmable microphone (e.g., 1350) according to disclosed embodiments.

It is a common dilemma for small law enforcement agencies adopting in-car video systems and/or portable camera surveillance systems to have to choose between manageability and technology complexity. A server based solution may require experienced computer technicians to maintain proper operation. In contrast, a non-server based solution may become challenging for maintaining system configuration, video search capabilities, and evidence life-cycle maintenance. A self-contained, removable storage device which stores a software application (or application suite), a media player, firmware/software updates for the mobile audio and/or video recording systems, and actual recorded audio and/or video or related metadata from the mobile audio and/or video recording systems (e.g., mobile surveillance system, body worn camera (e.g., 1050), remote audio recording radio/microphone 1350) is disclosed herein. This self-contained removable device may allow small police departments to utilize current technologies at a reduced overall cost. For example, a small police department utilizing self-contained storage devices may have benefits previously available only from server based solutions without the need to implement a server based solution or employ trained computer technicians. The software application(s) stored on the removable storage device may have any number of the following attributes: a) self-contained such that nothing is required to be installed on the computer device to run applications from the removable storage device; b) ability to manage configuration information of mobile video and/or audio recording devices used to store recorded media, related metadata, and audit logs; c) capable of moving recorded audio and/or video and snapshot images (e.g. digital photographs) to other storage areas securely; and d) capable of building catalogues for searching and indexing stored recordings (the recordings stored on the computer device or accessible via a network available to the computer device). The media player of the self-contained storage device allows for playing of available stored evidence. The disclosed firmware and/or software process allows for automatic maintenance of mobile surveillance devices, for example. The configuration information of the self-contained storage device may assist in maintaining chain of custody of evidence and authentication mechanisms including user logon information, device identity, and device configuration. All of the above capabilities of a self-contained storage device may be utilized by small and large police departments to streamline maintenance and upgrades for their fleet of vehicles containing mobile surveillance systems. Furthermore, while examples herein refer to police departments, it should be understood that the disclosure envisions broad applicability to any entity (e.g. FBI, CIA, DEA, Interpol, Scotland Yard etc.) involved in law enforcement activities which include, but are not limited to, functions that require maintenance of chain of custody of evidence.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable (unless otherwise stated) with any one or more of the other embodiments referenced herein, and any number of features of different embodiments are combinable with one another, unless indicated otherwise.

Similarly, although example processes have been described with regard to particular operations performed in a particular sequence, numerous modifications may be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A portable recording device, the portable recording device comprising:
a microphone;
a storage device, wherein the storage device is configured for storing one or more pre-configured applications for self-contained execution from the storage device; and
one or more processors communicatively coupled to the microphone and the storage device, wherein the one or more processors are configured to simultaneously record captured audio and metadata information and wirelessly stream the captured audio and metadata information to another device,
wherein the storage device comprises:
a storage area storing the one or more pre-configured applications, wherein the one or more pre-configured applications are configured for self-contained execution from the storage device;
a data access controller configured to control access to the storage area; and
firmware instructions configured for (i) permitting access from a computer system or computer device to the storage device upon successful authentication by the computer system or computer device, and (ii) preventing access from the computer system or computer device to the storage device absent successful authentication by the computer system or computer device,
wherein the self-contained execution is initiated on the computer system or computer device using execution information only from the storage device, and
wherein the preventing access comprises preventing completion of an enumeration process of the storage device with the computer system or computer device absent successful authentication from the computer system or computer device.

2. The portable recording device of claim 1, wherein the one or more pre-configured applications comprise:
a media player application to play multi-media files; and
a software application for a mobile surveillance system configured to manage configuration information of a mobile video/audio recording device and to catalogue available multi-media files to facilitate searching of the available multi-media files.

3. The portable recording device of claim 1, further comprising:
a camera,
wherein the one or more pre-configured applications are configured to manage video information obtained via the camera and associate the video information with audio information obtained via the microphone.

4. The portable recording device of claim 1, wherein the self-contained execution from the storage device comprises execution of the one or more pre-configured applications independently of information from an operating system registry on the computer system or computer device.

5. The portable recording device of claim 1, wherein the storage device comprises a secure storage drive, and the storage area comprises a flash memory storage area.

6. The portable recording device of claim 5, wherein the firmware instructions comprise:
a first portion of firmware instructions pertaining to access to the secure storage drive, the first portion of firmware instructions having access to unhide information stored on the secure storage drive, the unhide information pertaining to unhiding the secure storage drive; and
a second portion of firmware instructions pertaining to access to the flash memory storage area;
wherein the data access controller is further configured to utilize the first and second portions of firmware instructions to control access to the secure storage drive and the flash memory storage area;
wherein the first portion of firmware instructions comprises instructions that initiate execution upon connection of the secure storage drive to the computer system or computer device and block functional connection of the secure storage drive to the computer system or computer device unless the computer system or computer device provides proper authentication information, the proper authentication information corresponding to the unhide information, and
wherein upon receipt of proper authentication information, the first portion of firmware instructions allows functional connection of the secure storage drive to the computer system or computer device and allows the second portion of firmware instructions to control access requests from the computer device to the flash memory storage area.

7. The portable recording device of claim 1, further comprising at least one wireless communication interface communicatively coupled to the one or more processors.

8. The portable recording device of claim 7, wherein the at least one wireless communication interface is configured to utilize a wireless technology selected from the group consisting of radio frequency identification (RFID), Bluetooth, 802.11, and near field communication (NFC).

9. A method comprising:
connecting a portable recording device to a computer system or computer device, the portable recording device comprising a microphone, a storage device and one or more processors communicatively coupled to the microphone and the storage device, the storage device comprising one or more pre-configured applications stored thereon, the pre-configured applications being configured for self-contained execution from the storage device on the computer system or computer device;
permitting access from the computer system or computer device to the storage device upon successful authentication by the computer system or computer device;
preventing access from the computer system or computer device to the storage device absent successful authentication by the computer system or computer device; and
simultaneously recording captured audio and metadata information and wirelessly streaming the captured audio and metadata information to another device,
wherein the-self-contained execution from the storage device comprises initiating execution of the pre-configured applications utilizing execution information only from the storage device of the portable recording device, and
wherein the preventing access comprises preventing completion of an enumeration process of the storage device with the computer system or computer device absent successful authentication by the computer system or computer device.

10. The portable recording device of claim 1, further comprising:
a detector configured to detect an event; and
a trigger configured to initiate audio recording and/or video recording in response to a detected event.

11. The portable recording device of claim 1, wherein the portable storage device is configured for continuous loop recording and the portable storage device further comprises:
a pre-record buffer configured to continuously store audio and/or video information being recorded so as to possess a limited duration of recorded audio and/or video information immediately prior to any audio or video recording initiated by a user or triggered by a trigger.

12. The portable recording device of claim 7,
wherein the one or more processors are configured to stream audio information obtained using the microphone via the wireless communication interface to one or more associated surveillance system devices, and
wherein the one or more processors are configured to receive and send, via the wireless communication interface, control commands between the portable recording device and at least one of the one or more associated surveillance system devices.

13. The portable recording device of claim 7, further comprising:
a global positioning system, communicatively coupled to the one or more processors and the wireless communication interface.

14. The method of claim 9, further comprising:
initiating audio recording and/or video recording in response to a detected event.

15. The method of claim 9, further comprising:
tagging with metadata an audio recording and/or a video recording, the metadata comprising information indicating a detected event, the audio recording and/or video recording being initiated by the detected event.

16. The method of claim 9, wherein the portable recording device further comprises a wireless communication interface, and the method further comprises:
remotely controlling another device via the wireless communication interface.

17. The method of claim 9, wherein the portable recording device further comprises a wireless communication interface, and the method further comprises:
using information received via the wireless communication interface from a global positioning system to indicate time information and/or location information pertaining to recorded audio and/or video information, and/or to synchronize recorded audio and/or video information with other recorded audio and/or video information or to synchronize the portable recording device with another device.

18. The method of claim 9, further comprising:
performing continuous loop recording and storing of audio and/or video information.

19. The method of claim 9, wherein the portable recording device further comprises a wireless communication interface, and the method further comprises:
sending and/or receiving, via the wireless communication interface, control commands between the portable recording device and another device.

* * * * *